(12) United States Patent
Kim et al.

(10) Patent No.: US 11,204,095 B2
(45) Date of Patent: Dec. 21, 2021

(54) AUTOMOTIVE TRANSMISSION CONTROL APPARATUS

(71) Applicant: SL Corporation, Daegu (KR)

(72) Inventors: Minsoo Kim, Gyeongsangbuk-do (KR); Sungjin Kim, Gyeongsangbuk-do (KR); Mirae Do, Gyeongsangbuk-do (KR); Chun Nyung Heo, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 155 days.

(21) Appl. No.: 16/730,636

(22) Filed: Dec. 30, 2019

(65) Prior Publication Data

US 2020/0208738 A1 Jul. 2, 2020

(30) Foreign Application Priority Data

Dec. 31, 2018 (KR) .......................... 10-2018-0174241

(51) Int. Cl.
*F16H 1/32* (2006.01)
*F16H 61/02* (2006.01)
(Continued)

(52) U.S. Cl.
CPC ........... *F16H 61/0251* (2013.01); *F16H 1/32* (2013.01); *F16H 55/17* (2013.01); *F16H 57/02* (2013.01);
(Continued)

(58) Field of Classification Search
CPC ........ F16H 61/0251; F16H 1/32; F16H 55/17; F16H 57/02; F16H 61/0204;
(Continued)

(56) References Cited

U.S. PATENT DOCUMENTS 4,014,224 A * 3/1977 Pitts .......................... F16H 1/32
475/176
4,386,540 A * 6/1983 Skaggs, Jr. ............... F16H 1/32
475/176
(Continued)

FOREIGN PATENT DOCUMENTS

CN 1613681 A 5/2005
CN 104641538 A 5/2015
(Continued)

*Primary Examiner* — Justin Holmes
(74) *Attorney, Agent, or Firm* — Nelson Mullins Riley & Scarborough LLP; Kongsik Kim, Esq.

(57) ABSTRACT

Provided is an automotive transmission control apparatus. The automotive transmission control apparatus includes: a housing; a main shaft provided in the housing; a driving unit coupled to the main shaft and configured to be driven based on a signal for controlling a gear position of a transmission; a reduction unit housed within the driving unit; and an output unit to receive a rotational force of the reduction unit and output the rotational force with a reduced rotational speed. The reduction unit includes: an inner gear member coupled to the main shaft and including a first gear portion and a second gear portion; and an outer gear member fixed to the housing and including a first receiving gear portion engaged with the first gear portion. Further, the output unit includes a second receiving gear portion engaged with the second gear portion.

19 Claims, 25 Drawing Sheets

(51) Int. Cl.
*F16H 55/17* (2006.01)
*F16H 57/02* (2012.01)
(52) U.S. Cl.
CPC ..... *F16H 61/0204* (2013.01); *F16H 2708/22* (2013.01)
(58) Field of Classification Search
CPC ......... F16H 2708/22; F16H 2001/2881; F16H 61/32; F16H 2061/326; F16H 61/0003; F16H 63/42; F16H 2061/2892
See application file for complete search history.

(56) References Cited

U.S. PATENT DOCUMENTS

| | | | |
|---|---|---|---|
| 2005/0215375 A1 | 9/2005 | Kimura et al. | |
| 2006/0163025 A1* | 7/2006 | Hori | H02P 25/08 |
| | | | 192/219.5 |
| 2009/0000858 A1* | 1/2009 | Ikegaya | B62D 5/008 |
| | | | 180/444 |
| 2015/0219187 A1 | 8/2015 | Saito et al. | |

FOREIGN PATENT DOCUMENTS

| | | | | |
|---|---|---|---|---|
| CN | 106065940 A | | 11/2016 | |
| JP | 2006-304558 A | | 11/2006 | |
| JP | 2014011931 A | * | 1/2014 | |
| KR | 20120000507 A | * | 1/2012 | ............... F16H 1/32 |
| KR | 20150080056 A | | 7/2015 | |
| WO | WO-2018216421 A1 | * | 11/2018 | ............... F16H 1/32 |

* cited by examiner (a)

(b)

FIG. 12A
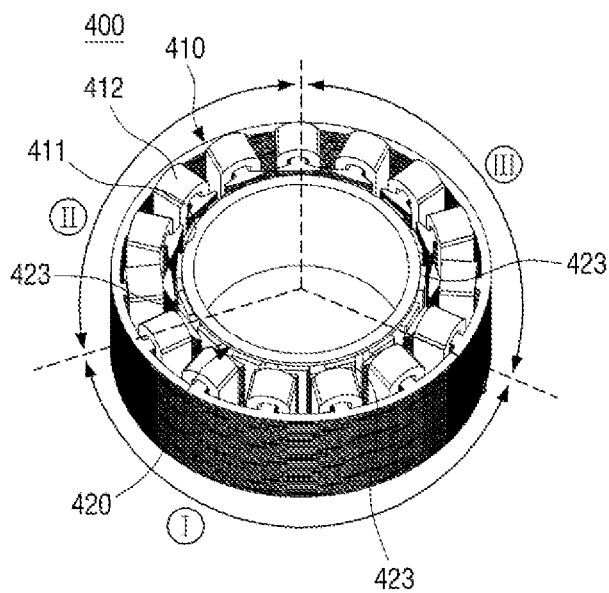
FIG. 12B
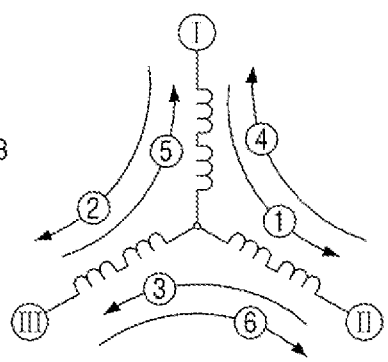
FIG. 12C
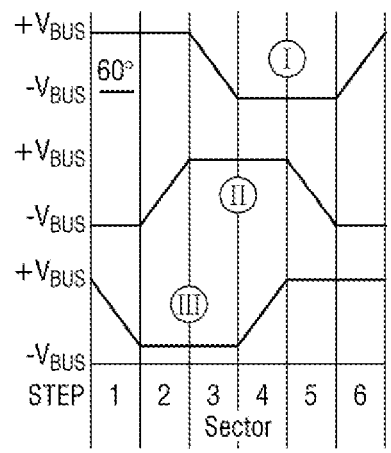
FIG. 12D
|  | Ⅰ | Ⅱ | Ⅲ |
|---|---|---|---|
| STEP 1(①) | O (+) | O (−) | X |
| STEP 2(②) | O (−) | X | O (+) |
| STEP 3(③) | X | O (+) | O (−) |
| STEP 4(④) | O (−) | O (+) | X |
| STEP 5(⑤) | O (+) | X | O (−) |
| STEP 6(⑥) | X | O (−) | O (+) |
O → + VOLTAGE APPLICATION
    − VOLTAGE APPLICATION
X → NON-VOLTAGE APPLICATION
    : PUTTING IN HIGH-Z STATE (a)

(b)

AUTOMOTIVE TRANSMISSION CONTROL APPARATUS

CROSS-REFERENCE TO RELATED APPLICATION

This application claims the benefit of Korean Patent Application No. 10-2018-0174241, filed on Dec. 31, 2018, the disclosure of which is incorporated herein by reference in its entirety.

BACKGROUND

1. Technical Field

The present disclosure relates to an automotive transmission control apparatus, and more particularly, to an automotive transmission control apparatus capable of reducing size and achieving high power.

2. Description of the Related Art

Generally, a transmission may be controlled to adjust a gear ratio based on vehicle speed in order to keep a rotational speed of an engine constant, and a shift lever operated by a driver to change the gear ratio of the transmission is provided within a vehicle.

Transmission modes of the transmission include a manual transmission mode in which a gear selection is manually changed by a driver and an automatic transmission mode in which the gear selection is automatically changed based on the vehicle speed when a driver selects a drive (D) position. In addition, a sports mode in which both the manual transmission mode and the automatic transmission mode are performed is also used. In the sports mode, a driver performs the manual transmission mode by manually changing the gear selection to a higher or lower gears while driving primarily in the automatic transmission mode.

The automatic transmission mode generally consists of a park (P) position used to park or stop a vehicle, a drive (D) position used to drive the vehicle forward, a reverse (R) position used to back the vehicle, and a neutral (N) position used to prevent the power of the engine from being transmitted to driving wheels.

Recently, a shift-by-wire system has been used. The shift-by-wire system transmits an operation signal generated based on a driver's shift lever operation through an electronic shift lever instead of a mechanical shift lever connected to a transmission by a mechanical cable, to allow the transmission to be controlled based on the operation signal.

In the shift-by-wire system, a driver's shift lever operating force is not transmitted to the transmission through a mechanical connection structure. Instead, a transmission control apparatus including an actuator or the like receives an operation signal generated based on the driver's shift lever operation from the electronic shift lever and controls the transmission based on the operation signal. When the electronic shift lever is used, the movement of the lever is detected via a sensor, and a signal corresponding to a selected gear position is transmitted to a transmission control unit (TCU). The TCU transmits a control signal to the transmission control apparatus for controlling the gear position of an automatic transmission, thereby changing the gear position. The transmission control apparatus is also referred to as a transmission range control module (TRCM).

The shift-by-wire system lacks a mechanical cable connection structure, unlike the mechanical shift lever, and transmits the driver's shift lever operation as an electrical signal. Therefore, unlike the mechanical shift lever, the shift-by-wire system offers an improved lever operating force or feeling, requires less space for shift operation, and is easier to operate than the mechanical shift lever.

A conventional automotive transmission control apparatus has eccentricity in order to improve the efficiency of a reducer. For eccentric driving, a module (reducer) in which an output unit is disposed and a module (driver) in which a motor is disposed are spaced apart from each other. Therefore, a rotating shaft of the reducer is disposed perpendicular or at an angle to a drive shaft, thus requiring a larger mounting space. In addition, since the size of the transmission control apparatus is increased, a larger space for mounting the transmission control apparatus is required. The automotive transmission control apparatus having the above structure typically has a greater number of parts and has poorer assemblability.

In this regard, there is a demand for a transmission control apparatus which enables internal structures to be coaxially driven, ensures flexibility in the mounting space, and enables a reduced size.

SUMMARY

Aspects of the present disclosure provide an automotive transmission control apparatus in which internal structures are coaxially disposed, specifically, a module (i.e., a reducer) having an output unit is coaxially disposed inside a motor unit and which may achieve high power and reduced size. Aspects of the present disclosure also provide an automotive transmission control apparatus in which a reducer module is eccentrically driven to improve a deceleration effect of the reducer module while structures are coaxially disposed. However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

According to an aspect of the present disclosure, an automotive transmission control apparatus may include: a housing; a main shaft provided in the housing; a driving unit coupled to the main shaft and configured to be driven based on a signal for controlling a gear position of a transmission; a reduction unit housed within the driving unit; and an output unit to receive a rotational force of the reduction unit and output the rotational force with a reduced rotational speed. In particular, the reduction unit may include: an inner gear member coupled to the main shaft and including a first gear portion and a second gear portion; and an outer gear member fixed to the housing and including a first receiving gear portion engaged with the first gear portion. Further, the output unit may include a second receiving gear portion engaged with the second gear portion.

Further, the output unit may include: an output body that forms the second receiving gear portion; and an output shaft that protrudes from the output body. In particular, the main shaft may be inserted into the output shaft, and the output shaft may transmit the rotational force of the reduction unit.

The main shaft may rotate due to the driving of the driving unit and may include a main rotary body that rotates about a first axis due to a rotation of the driving unit. The main shaft may include an eccentric rotary body provided along an outer circumferential surface of the main rotary body, and the eccentric rotary body may rotate about a second axis that is eccentric from the first axis due to the rotation of the driving unit. In particular, the inner gear member may be coupled to the eccentric shaft. The main rotary body may rotate about the first axis that extends from a center of the driving unit, and the eccentric rotary body may rotate about the second axis that spaced apart from the first axis by a predetermined distance and parallel to the first axis.

A bearing member may be further provided on the outside of the main shaft. A fixing protrusion for fixing the bearing member may protrude along an outer circumferential surface of the main shaft. The bearing member may include a first bearing disposed between the main rotary body at a lower end of the main shaft and the housing, and at least one second bearing disposed between the eccentric rotary body of the main shaft and an inner surface of the inner gear member. The at least one second bearing may be disposed on the fixing protrusion. Further, the bearing member may include a third bearing disposed between the main rotary body at an upper end of the main shaft and an inner surface of the output unit.

In particular, the second bearing may include an upper bearing disposed under the third bearing, and a lower bearing disposed on the fixing protrusion and under the upper bearing. The second bearing may be interference-fitted to the main shaft to prevent the inner gear member from contacting a rotor of the driving unit.

The housing may include: a main body that forms a housing space for receiving the driving unit, the reduction unit, and the output unit; and a cover member coupled onto the main body to cover the housing space. A seating portion on which the lower end of the main shaft and the first bearing are disposed may be formed in an inner bottom surface of the main body.

A driving control unit may be further mounted on a surface of the main body to apply power to the driving unit and control the rotation of the driving unit. An opening, in which the output shaft is accommodated and exposed, may be formed in the cover member. The inner gear member, the outer gear member, and the output body may be received within the driving unit.

A difference between a number of teeth of the first gear portion and a number of teeth of the first receiving gear portion may be equal to or less than four, and a difference between a number of teeth of the second gear portion and a number of teeth of the second receiving gear portion may be equal to or less than four.

Further, the driving unit may include: a stator that includes a stator core fixed to the housing and a plurality of coils disposed along an inner circumference of the stator core; and the rotor disposed within the stator and rotatably and coaxially coupled to the main shaft. The rotor may include magnets that correspond to the coils.

A sensing member may be further provided between the output unit and the housing to determine the gear position by detecting the rotation of the driving unit and detecting the rotation of the output unit. The sensing member may include: a substrate disposed between the output unit and the housing; a permanent magnet provided on a surface of the output body and rotated due to the rotation of the output body; a first Hall sensor provided on the substrate to detect a position of the permanent magnet; and a second Hall sensor provided on the substrate to detect a rotation of the rotor by interacting with the rotor provided in the driving unit.

A support member for supporting the substrate may be further provided between the substrate and the output unit and may include a first accommodating groove for accommodating the first Hall sensor and a second accommodating groove for accommodating the second Hall sensor.

Further, the first gear portion and the second gear portion may have a cycloidal tooth profile, and the first receiving gear portion and the second receiving gear portion may have a tooth profile that corresponds to the cycloidal tooth profile of the first gear portion and the second gear portion.

BRIEF DESCRIPTION OF THE DRAWINGS

These and/or other aspects will become apparent and more readily appreciated from the following description of the exemplary embodiments, taken in conjunction with the accompanying drawings in which:

FIGS. 12A-12D are diagrams for schematically explaining the operation of the driving unit having a three-phase structure in the automotive transmission control apparatus according to the exemplary embodiment of the present disclosure;

DETAILED DESCRIPTION

Figure 1:
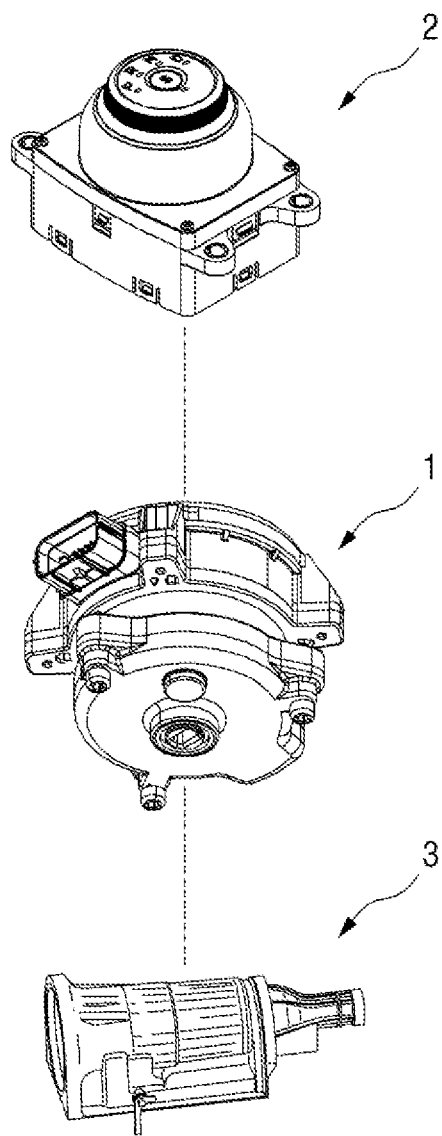
FIG. 1 is a schematic view of an automotive transmission control apparatus according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present disclosure will only be defined by the appended claims.

Therefore, in some embodiments, well-known processes, well-known structures and well-known technologies will not be specifically described in order to avoid ambiguous interpretation of the present disclosure. Like reference numerals refer to like elements throughout the specification.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated component, steps, operations, and/or elements, but do not preclude the presence or addition of one or more other components, steps, operations, elements, and/or groups thereof. As used herein, the term "and/or" includes any and all combinations of one or more of the associated listed items.

Exemplary embodiments of the disclosure are described herein with reference to cross-section and/or schematic illustrations that are illustrations of idealized exemplary embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. In addition, each element illustrated in figures of the present disclosure may have been enlarged or reduced for ease of description. Throughout the specification, like reference numerals in the drawings denote like elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present disclosure will be described with reference to the drawings for explaining an automotive transmission control apparatus 1 and method according to exemplary embodiments.

FIG. 1 is a schematic view of an automotive transmission control apparatus 1 according to an exemplary embodiment of the present disclosure. Referring to FIG. 1, the automotive transmission control apparatus 1 according to the exemplary embodiment of the present disclosure may be provided in a shift-by-wire system to receive an operation signal of a shift lever 2 and change a gear position of a transmission 3. The automotive transmission control apparatus 1 may be disposed within a housing 100 (to be described later with reference to FIGS. 2 and 3). The transmission 3 may be exposed outside the housing 100, and its gear position may be changed based on the rotation of an output unit 500 of the automotive transmission control apparatus 1 connected to the transmission 3. In addition, although a dial type shift lever is described as an example of the shift lever 2 in the exemplary embodiment, the shift lever 2 is not limited to the dial type and may also be a joystick type or a combination of the dial type and the joystick type.

In the exemplary embodiment, gear positions selectable by the operation of the shift lever 2 may include park (P), reverse (R), neutral (N), and at least one drive (D) positions. Specifically, the gear positions selectable by the operation of the shift lever 2 may include P, R, N, D, and lower gear positions. However, the gear positions are not limited to this example and may be variously changed depending on vehicle, driver's needs, or the like. For example, various other gear positions may be provided such as, for example, a position for storing the shift lever 2 (referred to as a 'stow position' or a 'storage position'), a manual transmission mode of a sports mode, and the like.

Figure 2:
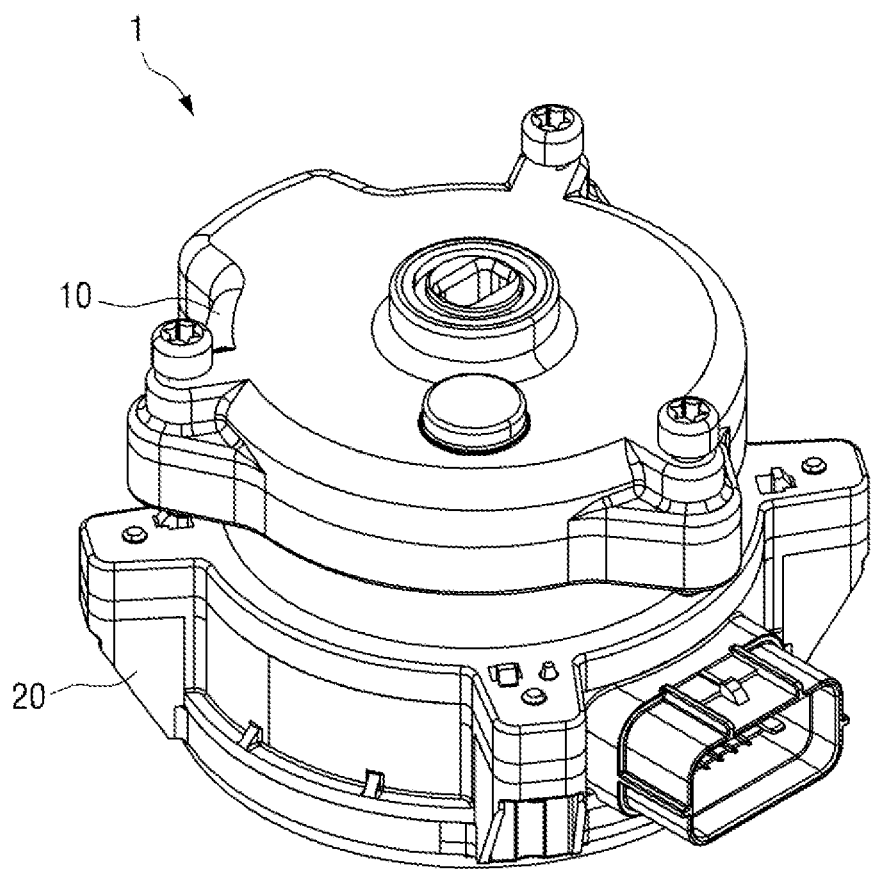
FIG. 2 is a schematic perspective view of the automotive transmission control apparatus according to the exemplary embodiment of the present disclosure.
Figure 3:
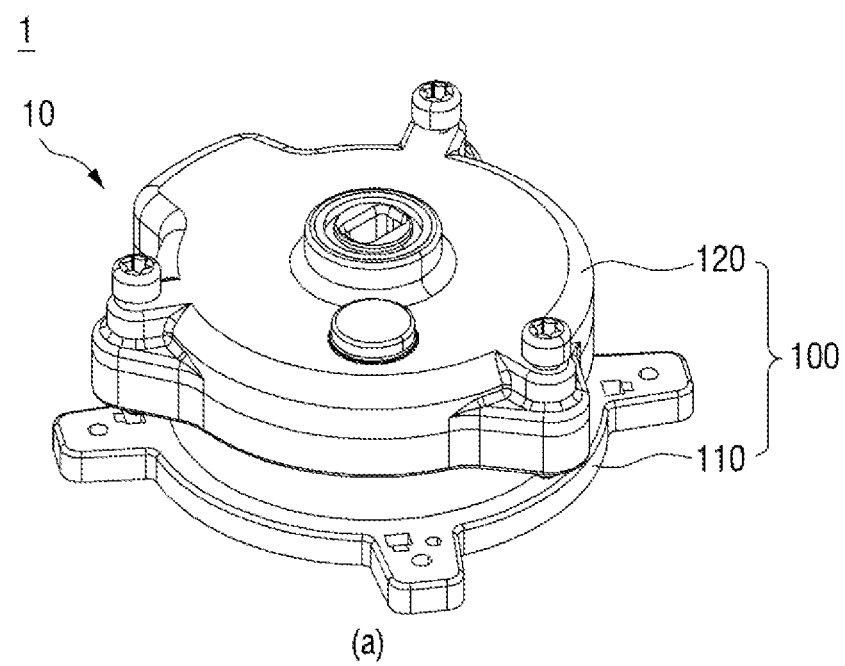
FIG. 3 is a partial exploded perspective view of the automotive transmission control apparatus according to the exemplary embodiment of the present disclosure.
Figure 3:
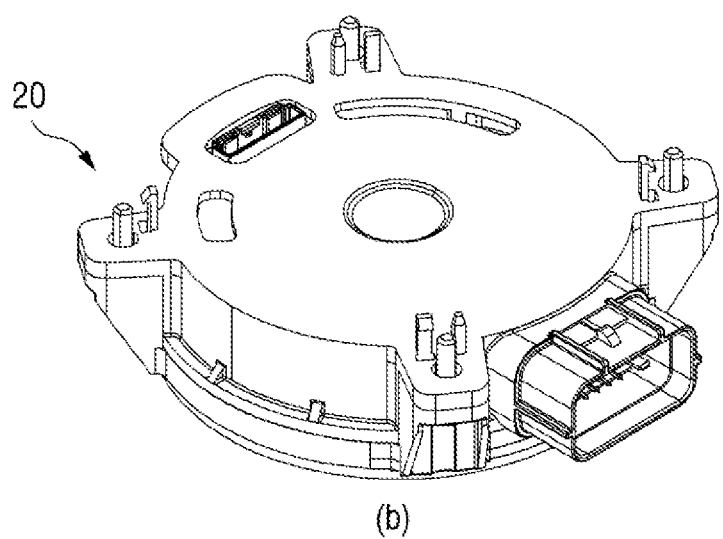
Figure 4:
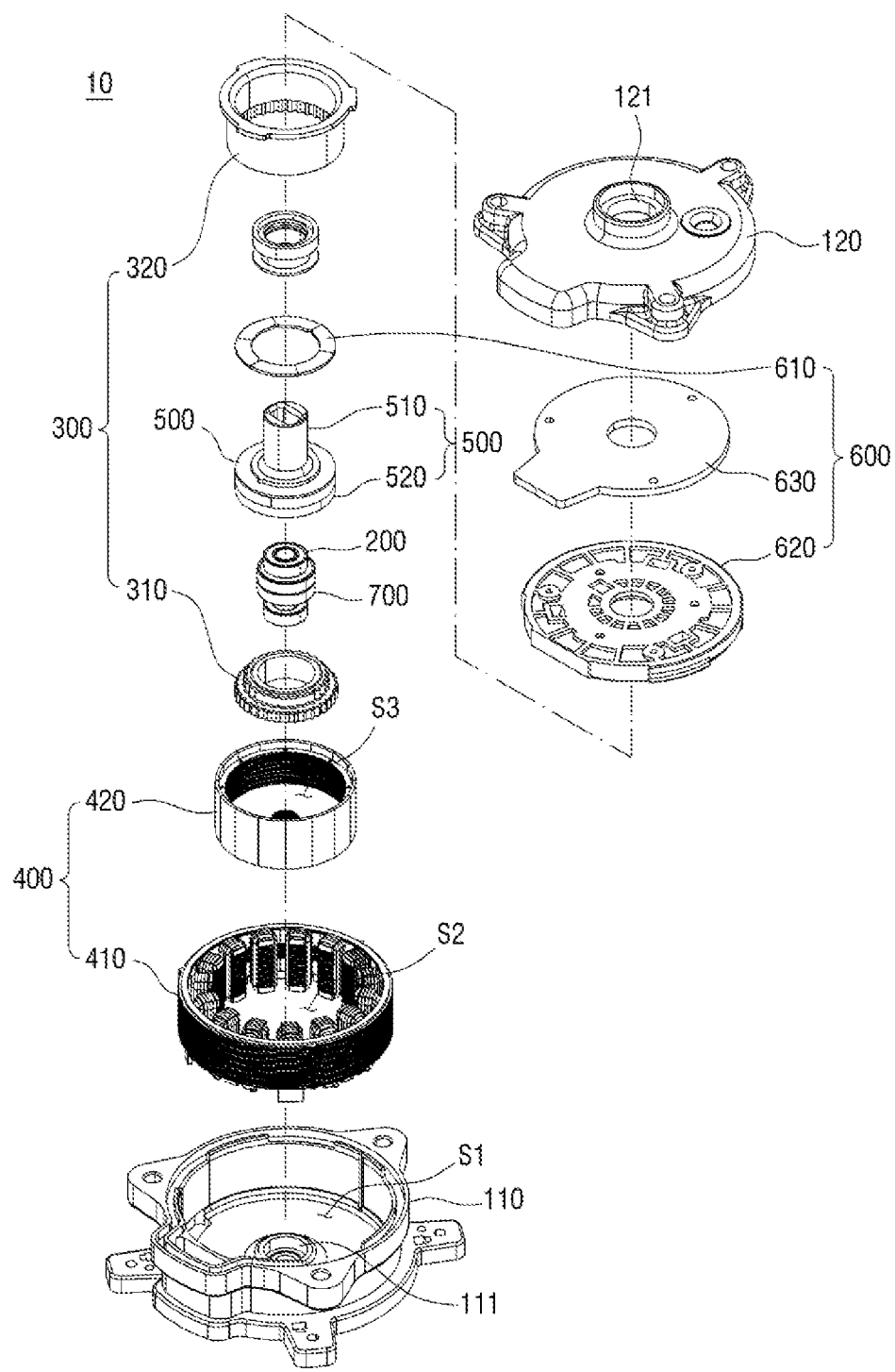
FIG. 4 is an exploded perspective view schematically illustrating the automotive transmission control apparatus according to the exemplary embodiment of the present disclosure.
Figure 5:
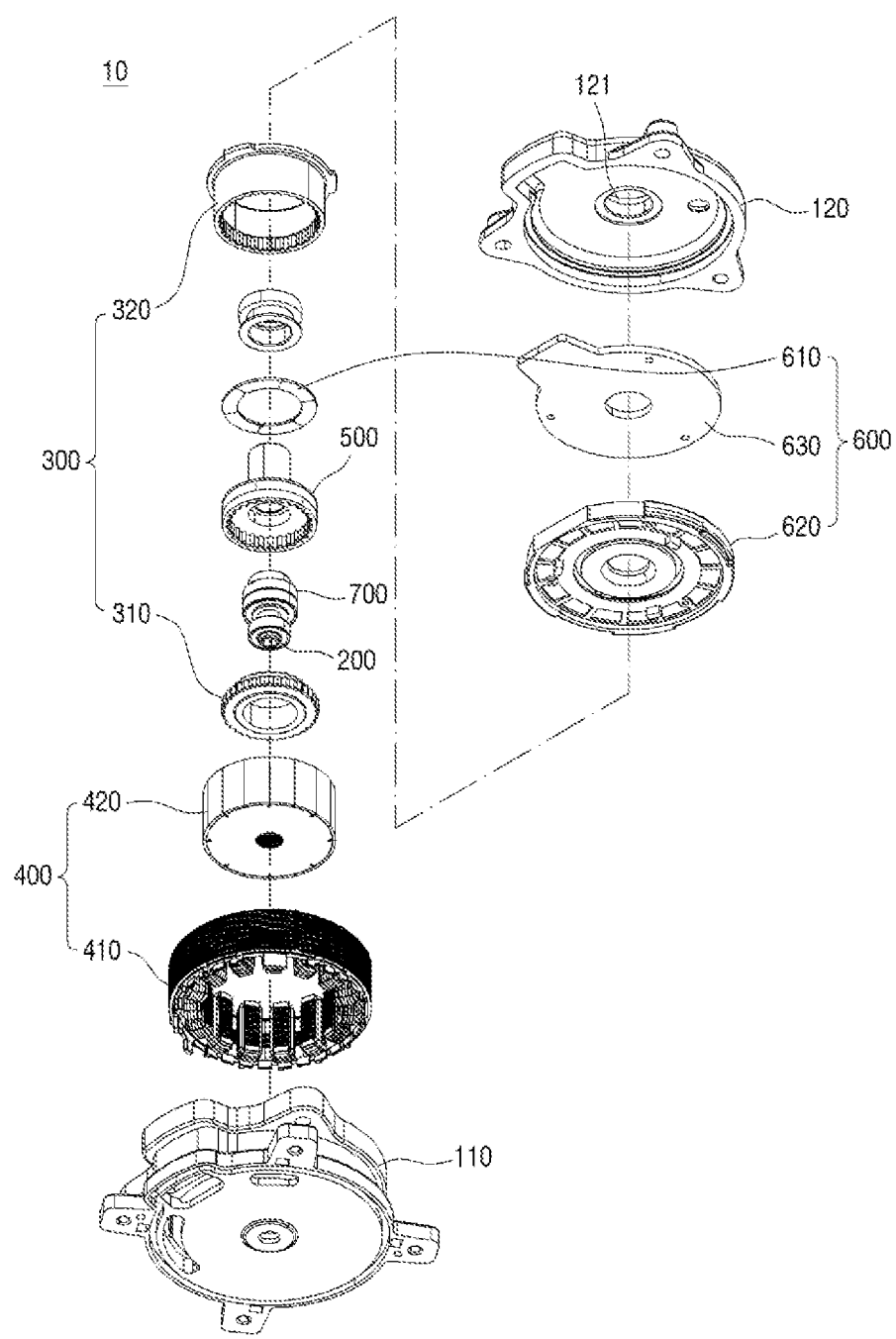
FIG. 5 is an exploded perspective view, from another direction, schematically illustrating the automotive transmission control apparatus according to the exemplary embodiment of the present disclosure.
Figure 6:
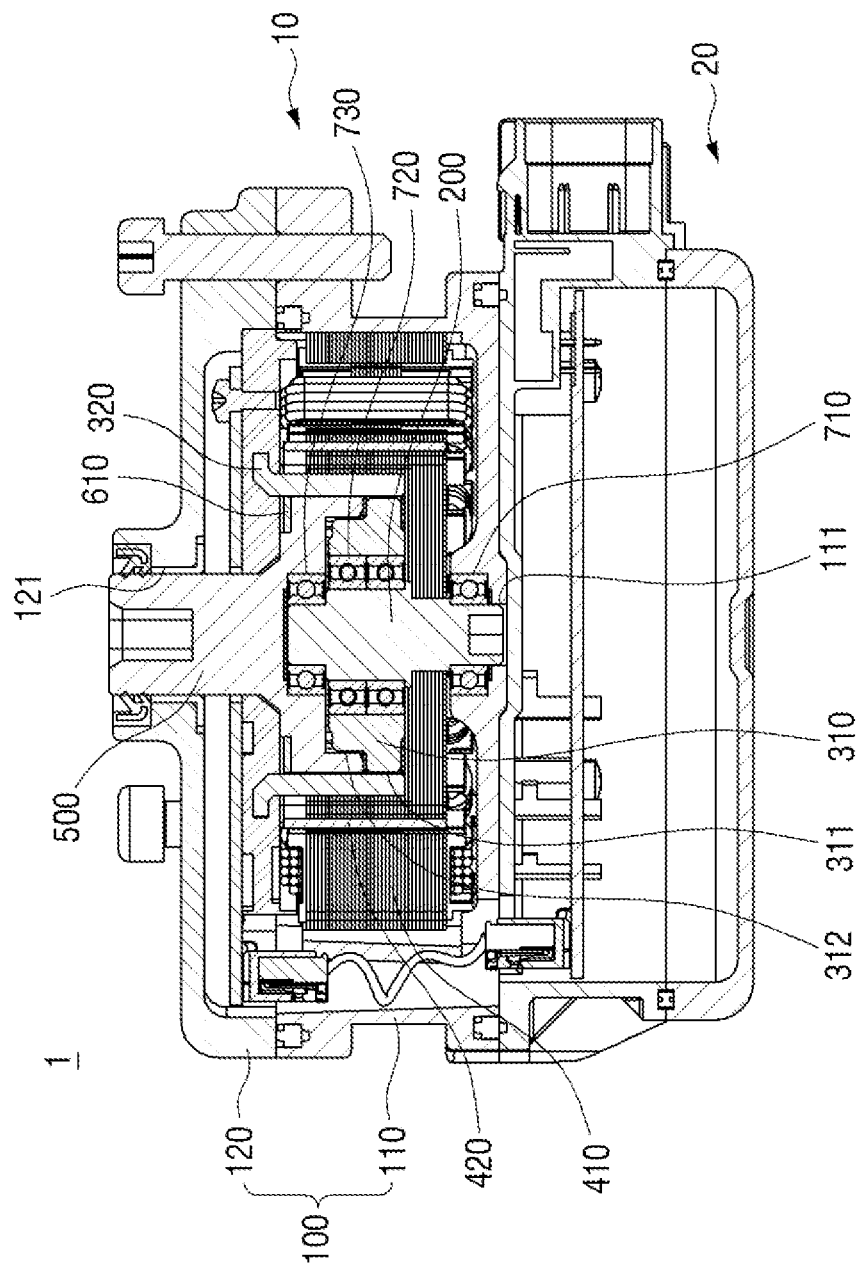
FIG. 6 is a schematic cross-sectional view of the automotive transmission control apparatus according to the exemplary embodiment of the present disclosure.
Figure 7:
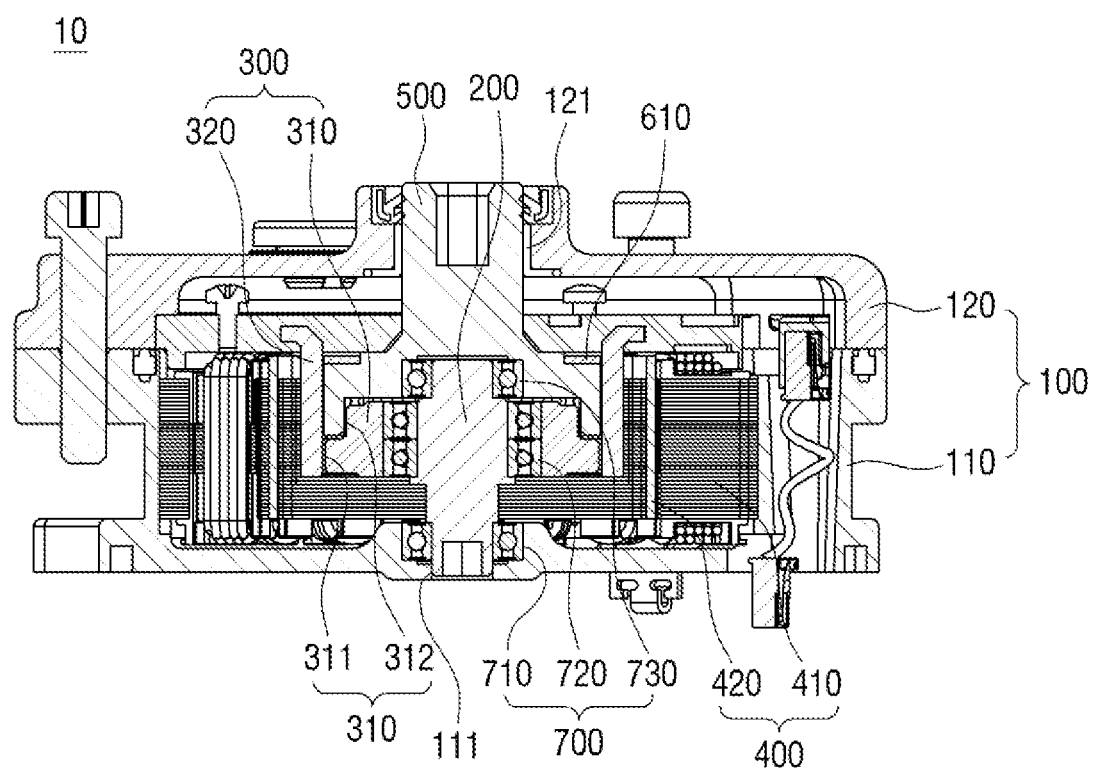
FIG. 7 is a schematic partial cross-sectional view of the automotive transmission control apparatus according to the exemplary embodiment of the present disclosure.

FIG. 2 is a schematic perspective view of the automotive transmission control apparatus 1 according to the exemplary embodiment. FIG. 3 is a partial exploded perspective view of the automotive transmission control apparatus 1 according to the exemplary embodiment. FIG. 4 is an exploded perspective view schematically illustrating the automotive transmission control apparatus 1 according to the exemplary embodiment. FIG. 5 is an exploded perspective view, from another direction, schematically illustrating the automotive transmission control apparatus 1 according to the exemplary embodiment. FIG. 6 is a schematic cross-sectional view of the automotive transmission control apparatus 1 according to the exemplary embodiment. FIG. 7 is a schematic partial cross-sectional view of the automotive transmission control apparatus 1 according to the exemplary embodiment.

Referring to FIGS. 2-7, the automotive transmission control apparatus 1 according to the exemplary embodiment may include a shift device 10 and a driving control unit 20. The shift device 10 may include the housing 100, a main shaft 200, a driving unit 400, a reduction unit 300, and the output unit 500.

The housing 100 may include a main body 110 which forms a housing space S1 for accommodating the main shaft 200, the driving unit 400, the reduction unit 300, and the output unit 500; and a cover member 120 which is coupled to a surface of the main body 110 to cover the housing space S1. In the automotive transmission control apparatus 1, the main body 110 may face downward, or the cover member 120 may face downward. However, the mounting position of the automotive transmission control apparatus 1 may be variously changed or modified based on the space in which the automotive transmission control apparatus 1 is disposed or the relationship of the automotive transmission control apparatus 1 with other structures.

A seating portion 111 having a groove shape or a mounting space may be formed in an inner bottom surface of the main body 110. A lower end of the main shaft 200 to be described later and a first bearing 710 mounted on an outer circumferential surface of the lower end of the main shaft 200 may be disposed on the seating portion 111. An opening 121 may be formed in the cover member 120, and the output unit 500 to be described later, more specifically an output shaft 510 that protrudes from the output unit 500 in a direction, may be mounted in and exposed through the opening 121. The cover member 120 may cover the open housing space S1 of the main body 110, and the driving control unit 20 may be mounted on the other surface of the main body 110 to apply power to the driving unit 400 and control the rotation of the driving unit 400.

Figure 8:
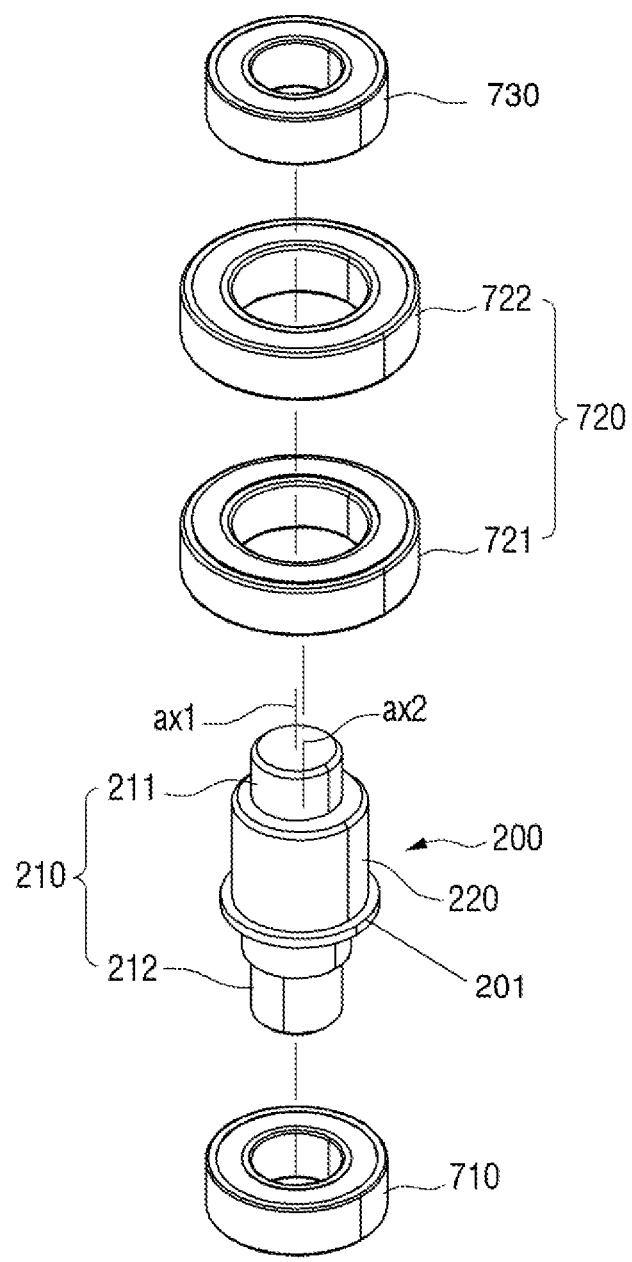
FIG. 8 is a schematic exploded perspective view of a main shaft and a bearing member in the automotive transmission control apparatus according to the exemplary embodiment of the present disclosure.
Figure 9:
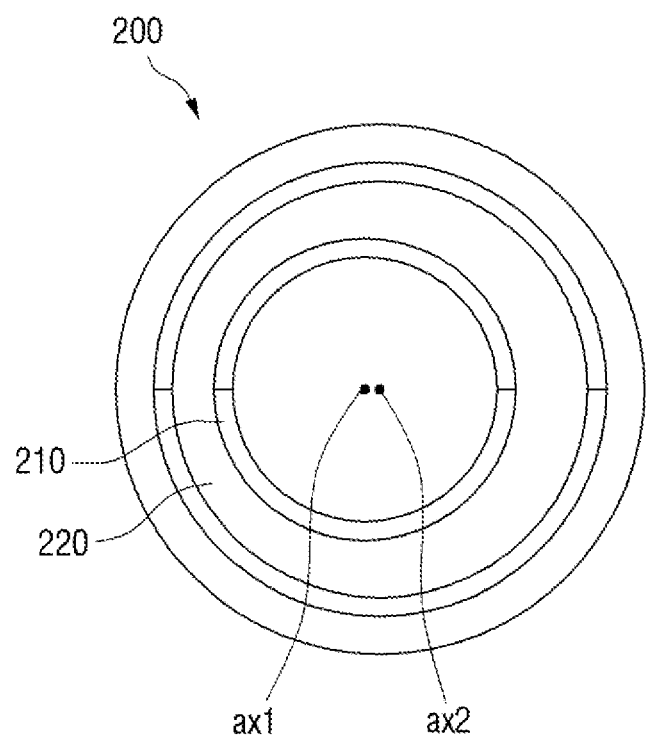
FIG. 9 is a plan view of the main shaft in the automotive transmission control apparatus according to the exemplary embodiment of the present disclosure.

FIG. 8 is a schematic exploded perspective view of the main shaft 200 and a bearing member 700 in the automotive transmission control apparatus 1 according to the exemplary embodiment. FIG. 9 is a plan view of the main shaft 200 in the automotive transmission control apparatus 1 according to the exemplary embodiment. Referring to FIGS. 8 and 9, the main shaft 200 according to the exemplary embodiment may be mounted in the housing 100, more specifically, on the seating portion 111 formed in a central part of the housing space S1 of the main body 110. The driving unit 400, the reduction unit 300, and the output unit 500 may be sequentially fitted and axially coupled to the main shaft 200 in the same direction.

In addition, the main shaft 200 may form rotation axes ax1 and ax2 of the driving unit 400, the reduction unit 300, and the output unit 500. The main shaft 200 may rotate about a first axis ax1 due to the driving of the driving unit 400. However, the reduction unit 300 which will be described later may be axially coupled to the main shaft 200 to allow the reduction unit 300, more specifically an inner gear member 310, to rotate about an eccentric rotation axis, i.e., a second axis ax2 eccentric from the first axis ax1 by a predetermined distance. In other words, when the main shaft 200 is rotated by the driving of the driving unit 400, the main shaft 200 may be rotated about the first axis ax1, but the inner gear member 310 of the reduction unit 300 may be rotated about the second axis ax2 which is a rotation axis eccentric from the first axis ax1 of the main shaft 200 by the predetermined distance. Further, due to the eccentricity, the second axis ax2 may revolve around the first axis ax1.

As mentioned above, the main shaft 200 may be mounted in the central part of the housing space S1 and rotated due to the driving of the driving unit 400. The main shaft 200 may include a main rotary body 210 and an eccentric rotary body 220. The main rotary body 210 may rotate about the first axis ax1 when the driving unit 400 rotates. A lower end 212 of the main rotary body 210 may be mounted on the seating portion 111, and an upper end 211 of the main rotary body 210 may be mounted in the opening 121 of the cover member 120.

The eccentric rotary body 220 may be provided between the upper end 211 of the main rotary body 210 and the lower end 212 of the main rotary body 210. The eccentric rotary body 220 may protrude from the main rotary body 210 to have a larger diameter than the main rotary body 210 and may form the second axis ax2 that is eccentric from the first axis ax1 of the main rotary body 210. The eccentric rotary body 220 may be integrally formed with or coupled to the main rotary body 210 to form a single body and may rotate about the second axis ax2, which is eccentric from the first axis ax1, due to the rotation of the driving unit 400. The inner gear member 310 may be coupled to the eccentric rotary body 220. Therefore, when the main shaft 200 rotates, the inner gear member 310 may rotate about the rotation axis of the eccentric rotatory body 220, i.e., the second axis ax2 that is eccentric from the first axis ax1.

The bearing member 700 may be further provided on the outside of the main shaft 200 to facilitate the rotation of the main shaft 200 when the main shaft 200 rotates. In addition, a fixing protrusion 201 for fixing the bearing member 700 to an end of the eccentric rotary body 220 may be formed along an outer circumferential surface of the main shaft 200.

The bearing member 700 may include the first bearing 710, a second bearing 720, and a third bearing 730. The first bearing 710 may be disposed between the main rotary body 210 at the lower end of the main shaft 200 and the housing 100, more specifically, the seating portion 111 to facilitate the rotation of the main rotary body 210 by enabling the main rotary body 210 at the lower end of the main shaft 200 to be slidably driven when the main rotary body 210 rotates on the seating portion 111.

The third bearing 730 may be disposed between the main rotary body 210 at an upper end 211 of the main shaft 200 and an inner surface of the output unit 500 to facilitate the rotation of the main rotary body 210 by enabling the main rotary body 210 at the upper end 211 of the main shaft 200 to be slidably driven when the main rotary body 210 rotates on the inner surface of the output unit 500.

The second bearing 720 may be mounted between the first bearing 710 and the third bearing 730 and may be disposed between the eccentric rotary body 220 of the main shaft 200 and an inner surface of the inner gear member 310. When the main shaft 200 rotates, the second bearing 720 may be slidably driven between the eccentric rotary body 220 of the main shaft 200 and the inner gear member 310 to facilitate the rotation of the eccentric rotary body 220. In addition, the second bearing 720 may include an upper bearing 722 and a lower bearing 721. Alternatively, the upper bearing 722 and the lower bearing 721 may be integrally formed with each other. The upper bearing 722 may be disposed under the third bearing 730, and the lower bearing 721 may be disposed on the fixing protrusion 201 and disposed under the upper bearing 722. The second bearing 720 may be interference-fitted to the main shaft 200 to prevent the inner gear member 310 from contacting a rotor 420 of the driving unit 400.

Figure 10:
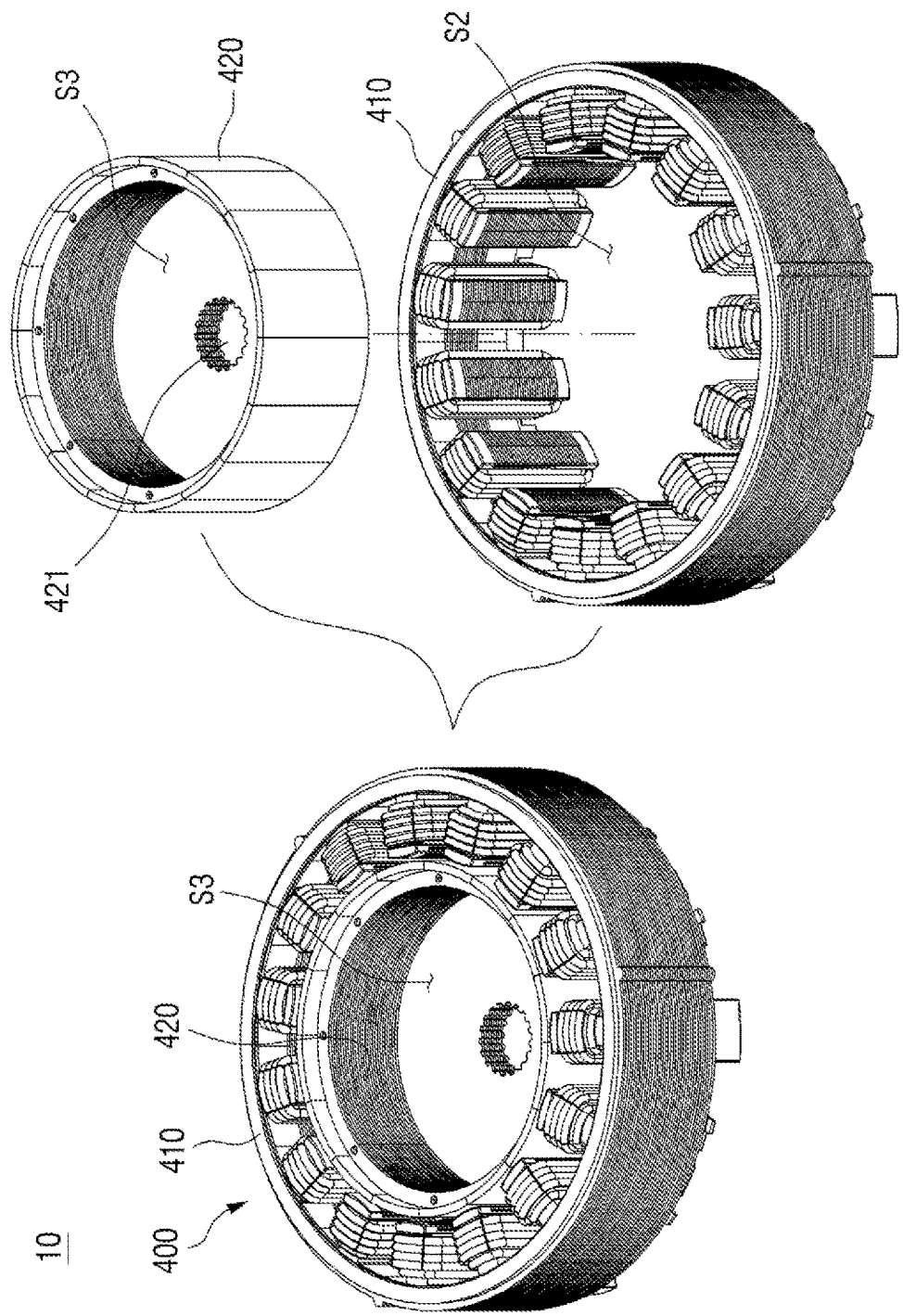
FIG. 10 schematically illustrates a driving unit in the automotive transmission control apparatus according to the exemplary embodiment of the present disclosure.
Figure 11:
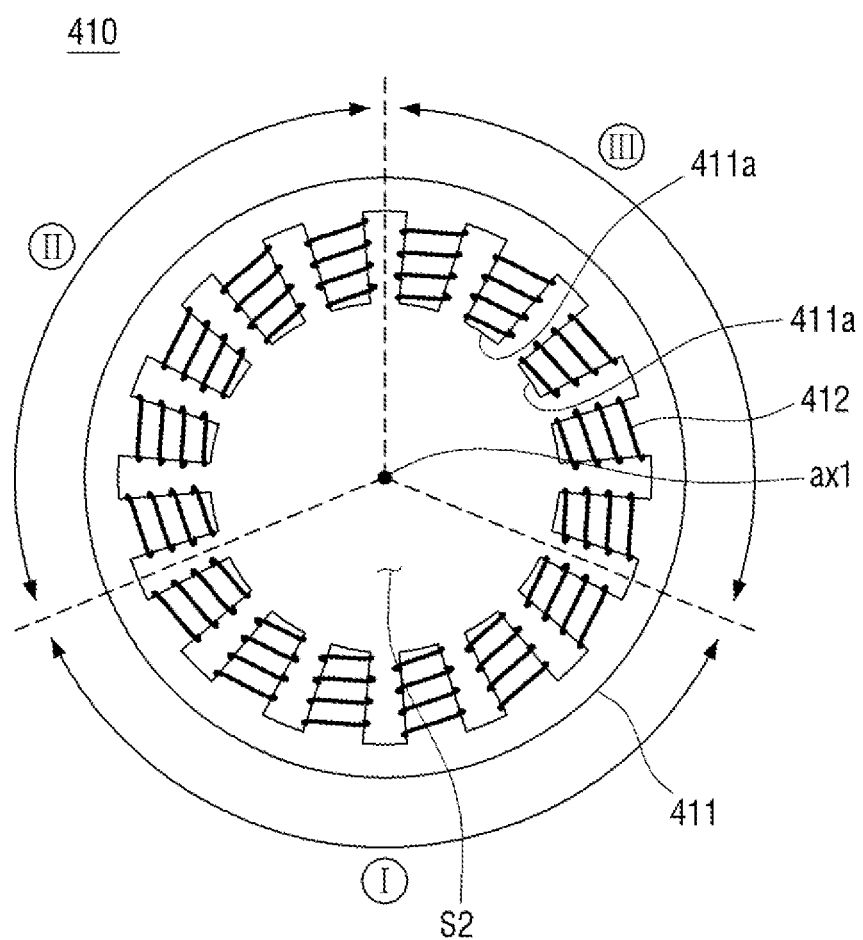
FIG. 11 schematically illustrates a stator of the driving unit in the automotive transmission control apparatus according to the exemplary embodiment of the present disclosure.

The driving unit 400 will now be described in detail with reference to FIGS. 10-15. FIG. 10 schematically illustrates the driving unit 400 in the automotive transmission control apparatus 1 according to the exemplary embodiment. FIG. 11 schematically illustrates a stator 410 of the driving unit 400 in the automotive transmission control apparatus 1 according to the exemplary embodiment. FIG. 12 is a diagram for schematically explaining the operation of the driving unit 400 having a three-phase structure in the automotive transmission control apparatus 1 according to the exemplary embodiment.

First, referring to FIGS. 10, 11, and 12A-12D, the driving unit 400 according to the exemplary embodiment may be coupled to the main shaft 200 and rotated about the first axis ax1 of the main shaft 200. The driving unit 400 may be driven based on a signal for controlling the gear position of the transmission. In addition, the driving unit 400 according to the exemplary embodiment may include a brushless direct current (BLDC) motor.

The driving unit 400 according to the exemplary embodiment may include the stator 410 and the rotor 420. The stator 410 according to the exemplary embodiment may include a stator core 411 and a plurality of coils 412. The stator core 411 may have a hollow cylindrical shape and may be fixed to the housing 100. Inner protrusions 411a may be formed on the stator core 411. The inner protrusions 411a may protrude toward the main shaft 200 along an inner circumference of the stator core 411, and the coils 412 to be described later may be mounted on (e.g., wound around) the inner protrusions 411a. A case where the number of the inner protrusions 411a according to the exemplary embodiment provided on the stator core 411 is fifteen will be described as an example. In addition, a case where the number of the coils 412 is also fifteen will be described as an example. The coils 412 according to the exemplary embodiment may have three phases. For example, the fifteen coils 412 provided in the present disclosure may form three phases, each being formed as a group of five adjacent coils 412 within a range of about 120 degrees to the main shaft 200. The coils 412 which form three phases based on about 120 degrees may be excited by different currents. Therefore, the coils 412 may rotate the rotor 420 by corresponding to magnets of the rotor 420 to be described later. The rotation of the rotor 420 based on the three phases of the coil 412 will be described in detail after the description of the rotor 420.

The rotor 420 according to the exemplary embodiment may be placed inside the stator 410, for example, in a space (hereinafter, referred to as a 'rotation space S2') formed by the coils 412 disposed along the inner circumference of the stator core 411. The rotor 420 may be coaxially coupled to the main shaft 200 and may be rotated about the first axis ax1 of the main shaft 200. The rotor 420 according to the exemplary embodiment forms a hollow (a space in which the reduction unit 300 to be described later is disposed, hereinafter referred to as a 'housing space S3'), and a rotary opening 421 into which the main shaft 200 is inserted may be formed at a center of a bottom surface of the rotor 420. The rotary opening 421 may correspond to the first axis ax1 of the main shaft 200 and may be rotated about the first axis ax1 according to the rotation of the main shaft 200. The rotor 420 may be mounted within the rotation space S2 and may be rotated about the first axis ax1 of the main shaft 200 within the rotation space S2. A plurality of magnets that correspond to the coils 412 may be mounted on an outer circumferential surface of the rotor 420.

The housing space S3 for housing the reduction unit 300 may be formed between the main shaft 200 and the inside of the rotor 420. On an upper side of the housing space S3, a support member 620 capable of supporting the rotation of the reduction unit 300 and the output unit 500 may be further provided between the main body 110 and the cover member 120. The support member 620 may be disposed under the cover member 120 and on the housing space S3. In addition, a substrate 630 on which a sensing member 600 to be described later, more specifically Hall sensors 632 and 633, are mounted may be disposed on a surface of the support member 620.

The stator 410 may be disposed and fixed in the housing space S1 of the housing 100, and the rotor 420 may be disposed in the rotation space S2 of the stator 410 and may be rotatably coupled to the main shaft 200. As described above, the driving unit 400 may be formed to have three phases. The coils 412 of the stator 410 may be repeatedly excited, thereby causing the rotor 420 to be rotated with respect to the stator 410. Specifically, as shown in FIGS. 12A and 12B, the coils 412 may be divided into a first region I which forms a first phase along a rotation direction about the main shaft 200, a second region II which forms a second phase, and a third region III which forms a third phase. The flow of current may vary depending on whether a voltage is applied to the coils 412 having the three phases. For example, when a positive (+) voltage is applied to the coils 412 of the first region I which forms the first phase and a negative (−) voltage is applied to the coils 412 of the second region II which forms the second phase (i.e., in the state of step 1), a current may flow as indicated by ① shown in FIG. 12B. When a negative (−) voltage is applied to the coils 412 of the first region I and a positive (+) voltage is applied to the coils 412 of the third region III which forms the third phase (i.e., in the state of step 2), the current may flow as indicated by ② shown in FIG. 12B. Such states may be summarized as in FIG. 12D. In particular, 'non-voltage application (X)' may refer to 'putting in a high impedance (high-z) state because no voltage is applied from either of high-side and low-side MOSFETs in a voltage inverter circuit to be mounted later.' The 'non-voltage application' may explain graphs in steps of FIG. 12C. The driving unit 400 may consist of a total of six steps as FIG. 12D. When a current is applied to the coils 412 having three phases within the range of about 120 degrees, the magnets (rotating bodies) of the driving unit 400 may be sequentially pushed to or pulled from an electromagnet, thereby rotating the rotor 420.

Figure 13:
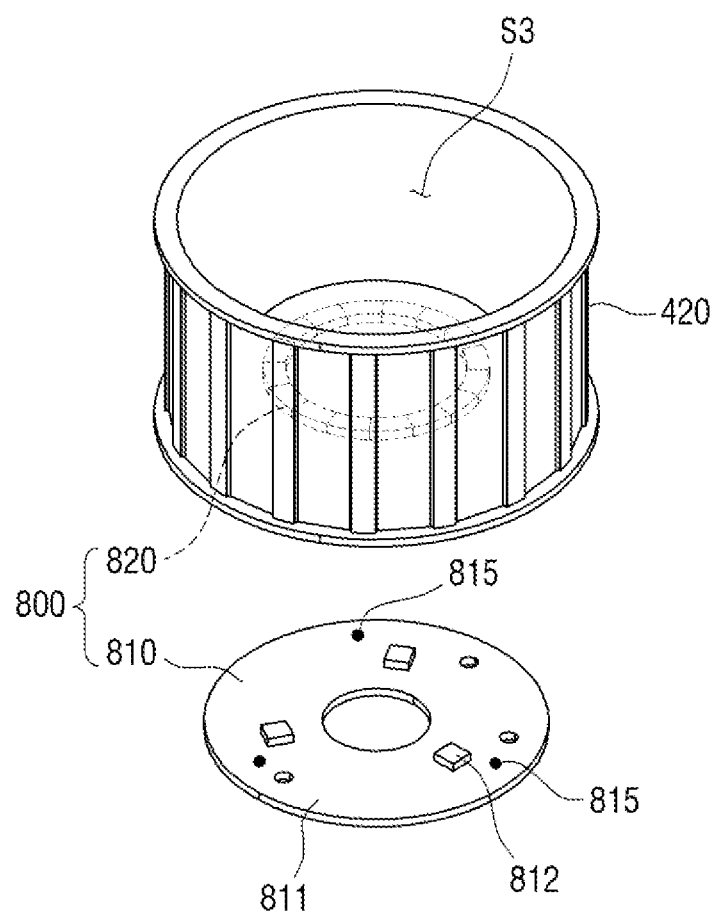
FIG. 13 schematically illustrates a rotor of the driving unit and a position sensing unit for detecting the rotation of the rotor in the automotive transmission control apparatus according to the exemplary embodiment of the present disclosure.

FIG. 13 schematically illustrates the rotor 420 of the driving unit 400 and a position sensing unit 800 for detecting the rotation of the rotor 420 in the automotive transmission control apparatus 1 according to the exemplary embodiment. Referring to FIG. 13, the position sensing unit 800 for sensing the rotation of the driving unit 400 may be provided between the driving unit 400 and the housing 100. The position sensing unit 800 according to the exemplary embodiment may include a substrate 811 which is provided in the housing 100, for example, on the bottom surface of the main body 110 and includes Hall sensors 812 and a permanent magnet 820 which is formed on the bottom surface of the rotor 420 to correspond to the Hall sensors 812. When the rotor 420 is rotated, the permanent magnet 820 provided on the bottom surface of the rotor 420 may also be rotated. In particular, the Hall sensors 812 provided on a bottom surface of the housing 100 may sense the permanent magnet 820, thereby detecting the number of rotations of the rotor 420. The position sensing unit 800, more specifically, three Hall sensors 812 may be provided on the substrate 811 at intervals of about 120 degrees and may correspond to the first region I, the second region II, and the third region III with respect to the main shaft 200.

As described above, the position sensing unit 800 for sensing the rotation of the driving unit 400 may be provided between the driving unit 400 and the housing 100 of the present disclosure. However, the position sensing unit 800 may also be substituted by the sensing member 600 to be described later.

Figure 14:
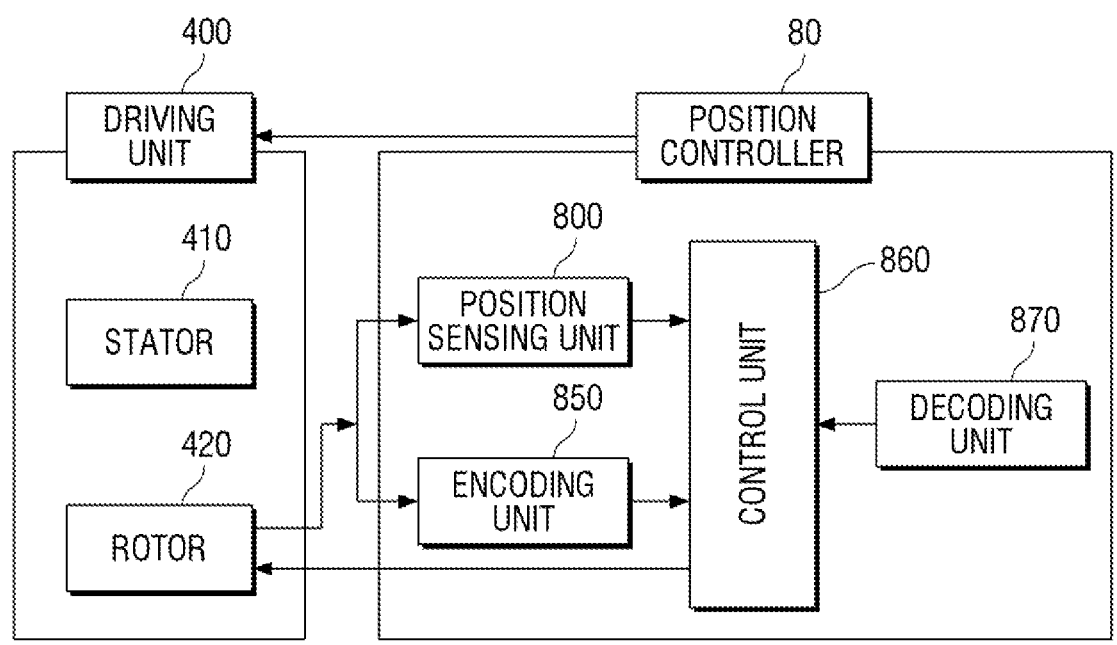
FIG. 14 is a block diagram illustrating a state where a position controller is connected to the driving unit in the automotive transmission control apparatus according to the exemplary embodiment of the present disclosure.
Figure 15:
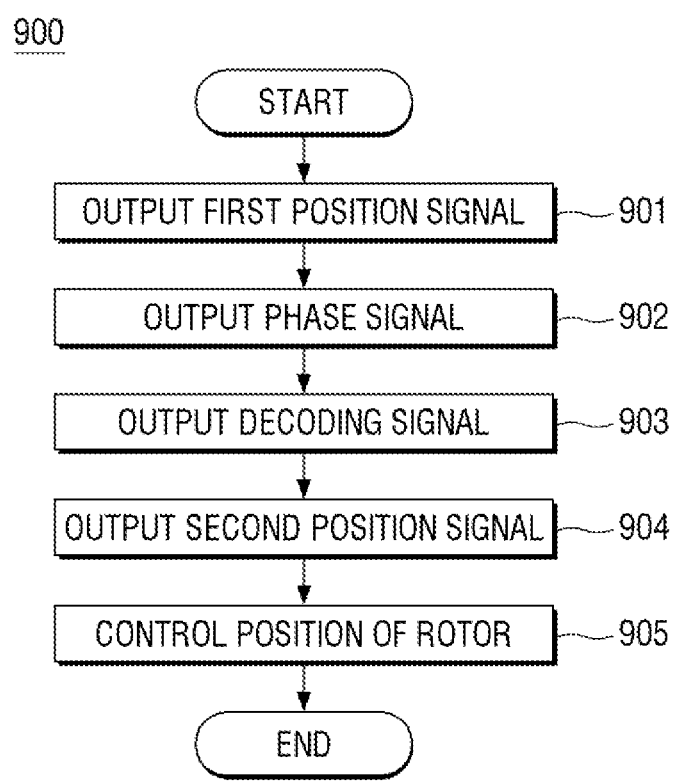
FIG. 15 is a flowchart schematically illustrating a position control method performed using the position controller for the driving unit in the automotive transmission control apparatus according to the exemplary embodiment of the present disclosure.

FIG. 14 is a block diagram illustrating a state where a position controller 80 is connected to the driving unit 400 in the automotive transmission control apparatus 1 according to the exemplary embodiment. FIG. 15 is a flowchart schematically illustrating a position control method performed using the position controller 80 for the driving unit 400 in the automotive transmission control apparatus 1 according to the exemplary embodiment. Referring to FIGS. 14 and 15, the position controller 80 may include the position sensing unit 800, an encoding unit 850, a decoding unit 870, and a control unit 860. The position sensing unit 800 may sense and output a first position signal based on the position of the rotor 420 of the driving unit 400. As described above, the position sensing unit 800 may sense and output the first position signal using the three Hall sensors 812 installed at intervals of about 120 degrees.

Figure 16:
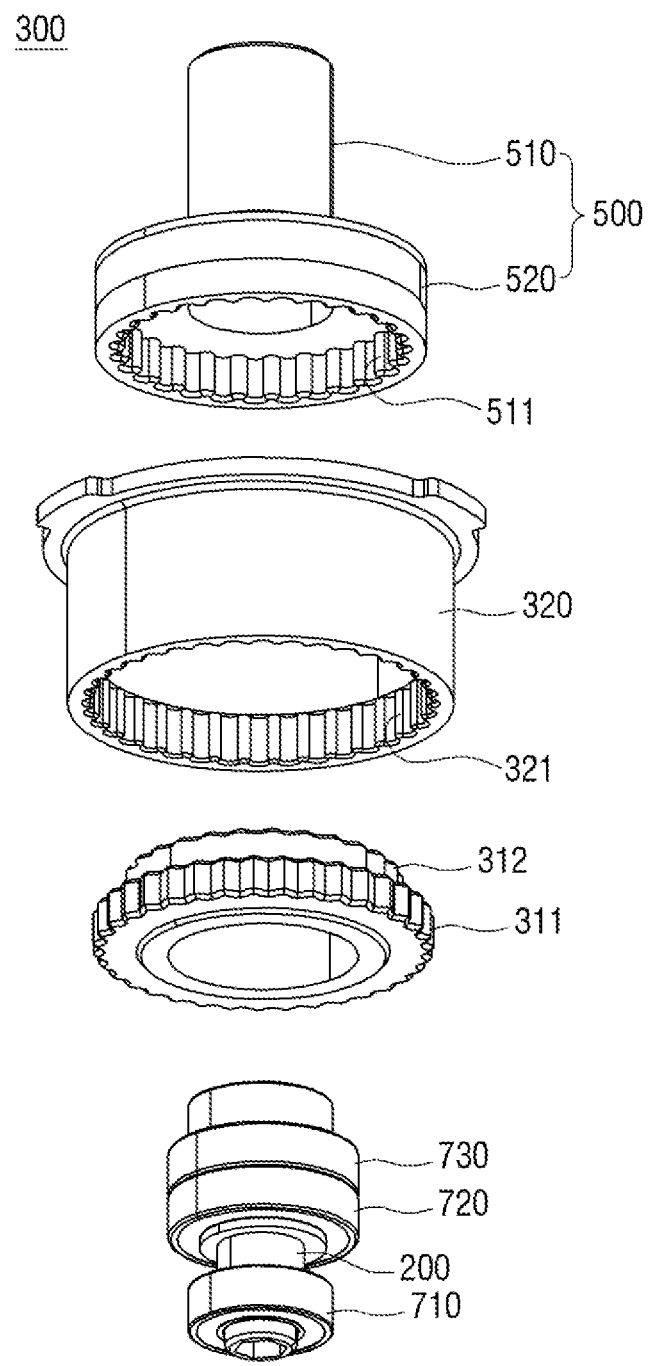
FIG. 16 is a schematic exploded perspective view of an output unit, a reduction unit and the main shaft in the automotive transmission control apparatus according to the exemplary embodiment of the present disclosure.
Figure 17:
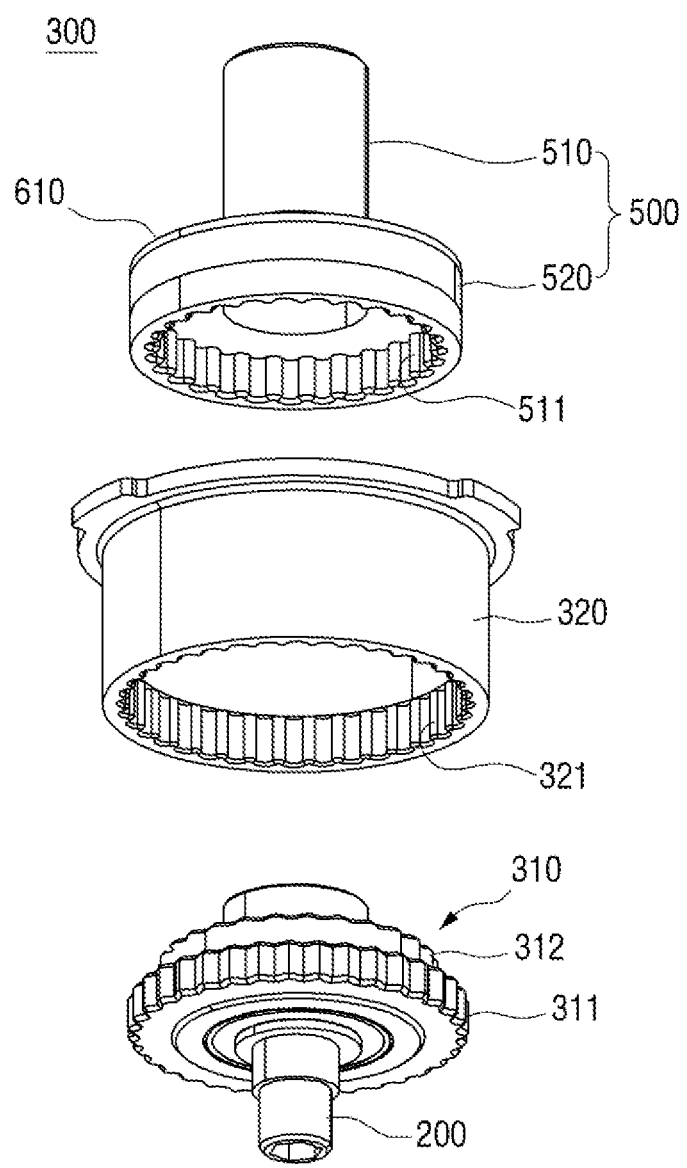
FIG. 17 is a schematic exploded perspective view of an inner gear member mounted on the main shaft, the output unit, and an outer gear member in the automotive transmission control apparatus according to the exemplary embodiment of the present disclosure.
Figure 18:
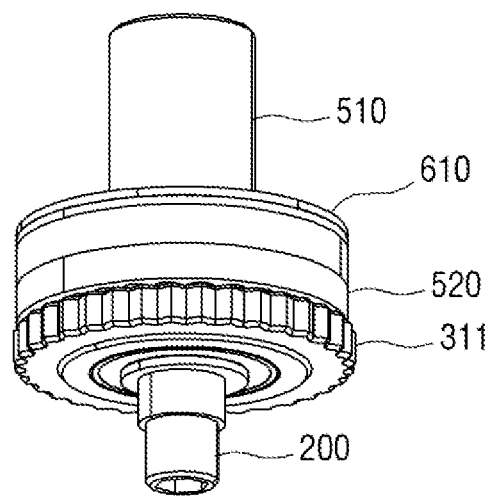
FIG. 18 is a perspective view illustrating the coupled state of the reduction unit, the main shaft and the output unit in the automotive transmission control apparatus according to the exemplary embodiment of the present disclosure.
Figure 18:
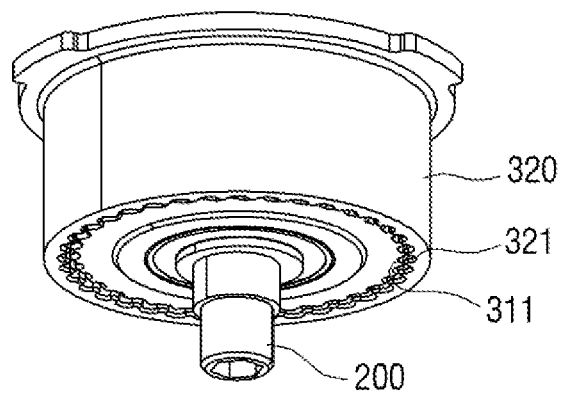

FIG. 16 is a schematic exploded perspective view of the output unit 500, the reduction unit 300 and the main shaft 200 in the automotive transmission control apparatus 1 according to the exemplary embodiment. FIG. 17 is a schematic exploded perspective view of the inner gear member 310 mounted on the main shaft 200, the output unit 500, and an outer gear member 320 in the automotive transmission control apparatus 1 according to the exemplary embodiment. FIG. 18 is a perspective view illustrating the coupled state of the reduction unit 300, the main shaft 200 and the output unit 500 in the automotive transmission control apparatus 1 according to the exemplary embodiment.

Referring to FIGS. 16-18, the reduction unit 300 according to the exemplary embodiment may be disposed within the driving unit 400, may be coupled to the main shaft 200, and may receive a rotation of the driving unit 400 and reduce a rotational speed. The reduction unit 300 coupled to the main shaft 200 may be coupled and fixed to a primary axis (corresponding to the first axis ax1) or an eccentric axis (corresponding to the second axis ax2) of the main shaft 200 that is rotated by the driving unit 400. In addition, the driving unit 400 may rotate about the first axis ax1 of the main shaft 200, but the reduction unit 300 may rotate about the first axis 1 and the second axis ax2 of the main shaft 200. The reduction unit 300 coupled to the primary axis (the first axis ax1) or the eccentric axis (the second axis ax2) of the main shaft 200 as described above may be mounted in the housing space S3 of the driving unit 400 formed inside the rotor 420.

The reduction unit 300 according to the exemplary embodiment may include the inner gear member 310 and the outer gear member 320. In addition, the output unit 500 fitted to (e.g., meshed with) the reduction unit 300 may output a reduced rotational speed of the reduction unit 300.

The inner gear member 310 may be eccentrically coupled to the main shaft 200. More specifically, the inner gear member 310 may be coupled to the eccentric rotary body 220 of the main shaft 200 and may be eccentrically rotated about the rotation axis of the eccentric rotary body 220, i.e., the second axis ax2 due to the rotation of the main shaft 200. The inner gear member 310 may be formed in a multi-tier, more specifically, two-tier disk-shaped ring gear. The inner gear member 310 may include a disk-shaped first tier and a disk-shaped second tier disposed on the first tier. A first gear portion 311 may be formed on the outside of the first tier, and a second gear portion 312 may be formed on the outside of the second tier.

The outer gear member 320 may be fixed to the housing 100. Specifically, the outer gear member 320 may be formed in a pipe-shape, in which surfaces that face each other are open, and an outer peripheral portion of the outer gear member 320 may be non-rotatably coupled to the support member 620. The main shaft 200 inserted into a rotary opening at a center of the inner gear member 310 may be disposed in a central part of the inside of the outer gear member 320. The first tier of the inner gear member 310 may be disposed on an inner circumferential surface of a lower end of the outer gear member 320. In particular, a first receiving gear portion 321 to be engaged with the first gear portion 311 formed on an outer circumferential surface of the first tier may be formed on the inner circumferential surface of the lower end of the outer gear member 320.

A difference in the numbers of teeth between the first gear portion 311 and the first receiving gear portion 321 may be equal to or less than four, and may be, for example, one or two. In other words, the first receiving gear portion 321 may have a greater number of teeth than the first gear portion 311 by four or less, for example, by one or two. For example, the number of teeth of the first gear portion 311 may be fifteen, and the number of teeth of the first receiving gear portion 321 may be sixteen. Accordingly, a gear ratio of the first gear portion 311 and the first receiving gear portion 321 may be 1/15. The numbers of the teeth of the first gear portion 311 and the first receiving gear portion 321 may be varied based on design considerations.

The output unit 500 may include an output body 520 and an output shaft 510. The output body 520 may be disposed on the first gear portion 311, i.e., on an upper side of the first tier. A space in which an upper end of the inner gear member 310 and the upper end of the main shaft 200 are disposed may be formed inside the output body 520. A second receiving gear portion 511 to be engaged with the second gear portion 312 formed on an outer circumference of the second tier may be formed on an inner circumferential surface of the space of the output body 520.

The difference in the number of teeth between the second gear portion 312 and the second receiving gear portion 511 may be one or two. In other words, the second receiving gear portion 511 may have one or two more teeth than the second gear portion 312. For example, the number of teeth of the second gear portion 312 may be thirteen, and the number of teeth of the second receiving gear portion 511 may be fourteen. Accordingly, a gear ratio of the second gear portion 312 and the second receiving gear portion 511 may be 1/13. The number of the teeth of the second gear portion 312 and the second receiving gear portion 511 may be varied based on design considerations.

A reduction ratio of the reduction unit 300 may be determined by a gear ratio of the inner gear member 310 and the outer gear member 320, and a gear ratio of the inner gear member 310 and the output unit 500. In other words, when the first gear portion 311 having fifteen gear teeth and the first receiving gear portion 321 having sixteen gear teeth, a gear ratio of (16-15)/15=1/15 may be obtained between the first gear portion 311 and the first receiving gear portion 321.

Based on a reduction ratio of the first tier and a reduction ratio of the second tier, a final reduction ratio of an exemplary embodiment may be obtained as a reciprocal of, $$\frac{(1/GR_1) \times \{(1/GR_2) + 1\}}{(1/GR_1) - (1/GR_2)}$$

wherein $GR_1$ represents the gear ratio between the first gear portion 311 and the first receiving gear portion 321, and $GR_2$ represents the gear ratio between the second gear portion 312 and the second receiving gear portion 511. For example, when the gear ratio between the first gear portion 311 and the first receiving gear portion 321 is 1/15 and the gear ratio between the second gear portion 312 and the second receiving gear portion 511 is 1/13, the final reduction ratio may be 1/105, which is the reciprocal of 15×(13+1)/(15−13)=105.

The number of gear teeth of the first gear portion 311, the number of gear teeth of the first receiving gear portion 321, the number of gear teeth of the second gear portion 312 and the number of gear teeth of the second receiving gear portion 511 according to the exemplary embodiment are not limited to the above numbers and may be varied or modified based on a ratio by which the rotational speed of the driving unit 400 is designed to be reduced.

In addition, the first gear portion 311 and the second gear portion 312 may have a cycloidal tooth profile. In addition, the first receiving gear portion 321 and the second receiving gear portion 511 may have a cycloidal tooth profile to correspond to the first gear portion 311 and the second gear portion 312 or may have a gear tooth profile (e.g., spur gears) that engages with the cycloidal tooth profile of the first gear portion 311 and the second gear portion 312.

Herein, cycloidal teeth have a greater contact ratio than typical spur gears and may provide an improved contact with each other. Since cycloidal teeth are resistant to impact, they may better withstand wear and tear and may have an improved durability. In addition, cycloidal teeth may transmit a force with higher efficiency than typical spur gears due to their high contact ratio. In addition, since cycloidal teeth may provide an improved contact with each other, they may cause less noise and less backlash.

The output shaft 510 may protrude from the output body 520, and the main shaft 200, more specifically the upper end 211 of the main rotary body 210 of the main shaft 200, may be inserted into the output shaft 510. The output shaft 510 may receive the rotational force of the reduction unit 300 and output the rotational force with a reduced rotational speed.

Figure 19:
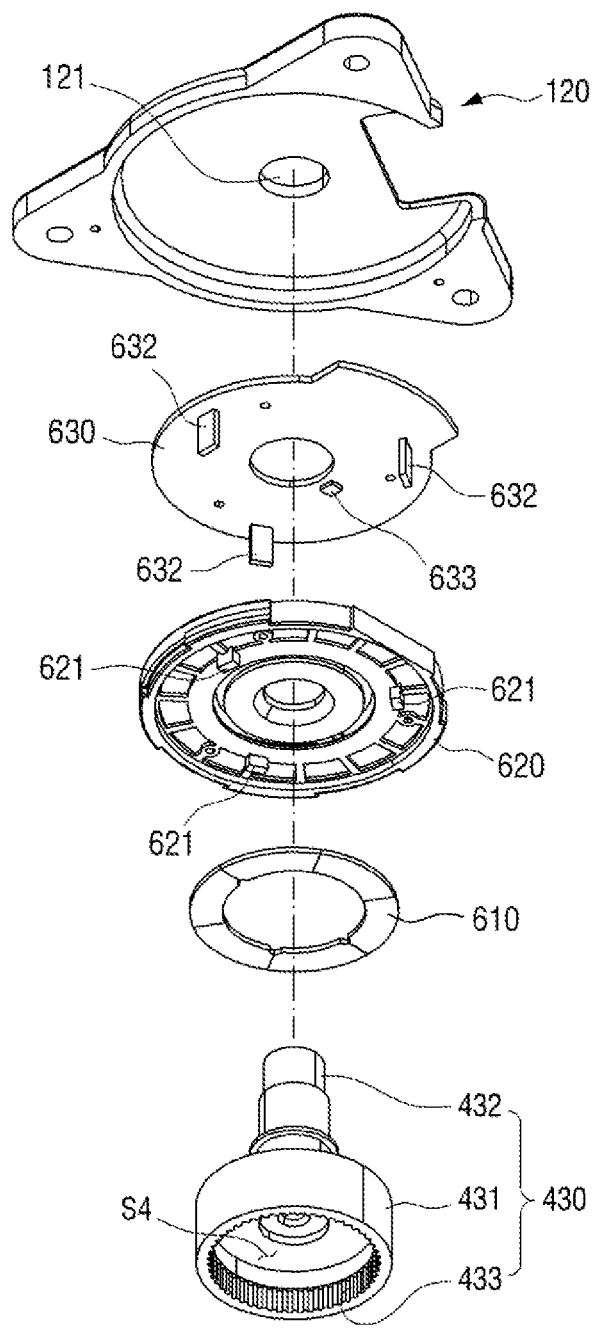
FIG. 19 is a schematic exploded perspective view of the automotive transmission control apparatus including an sensing member according to the exemplary embodiment of the present disclosure.
Figure 20:
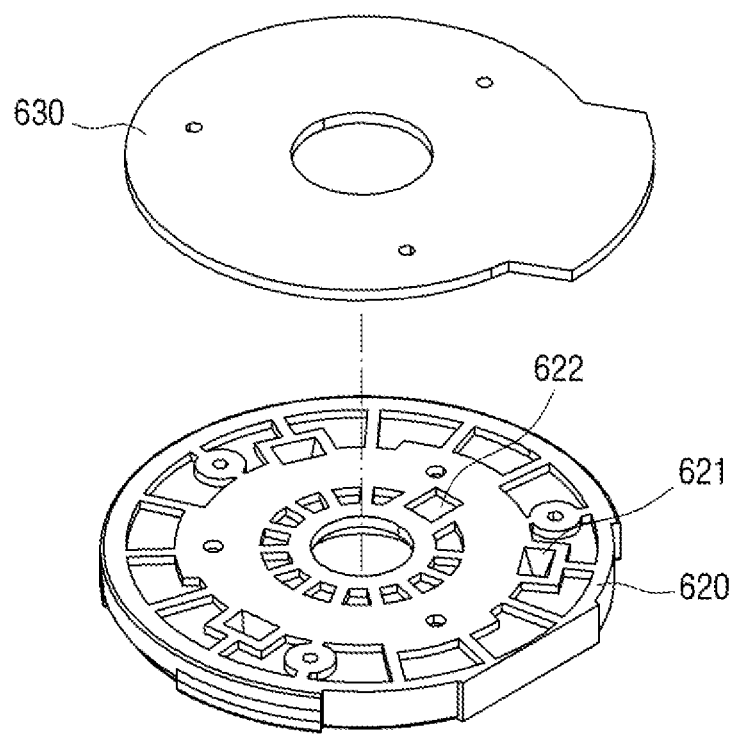
FIG. 20 is a schematic exploded perspective view of the sensing member in the automotive transmission control apparatus according to the exemplary embodiment of the present disclosure.
Figure 21:
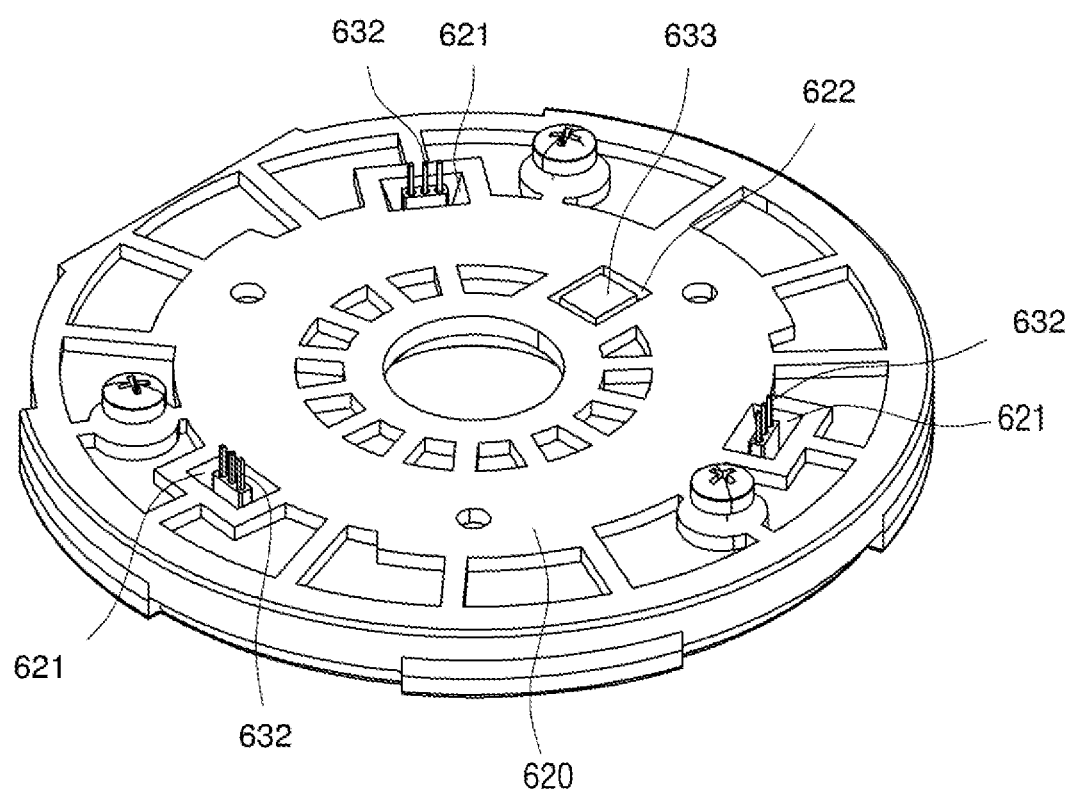
FIG. 21 schematically illustrates a support member in the automotive transmission control apparatus according to the exemplary embodiment of the present disclosure shown with Hall sensors.
Figure 22:
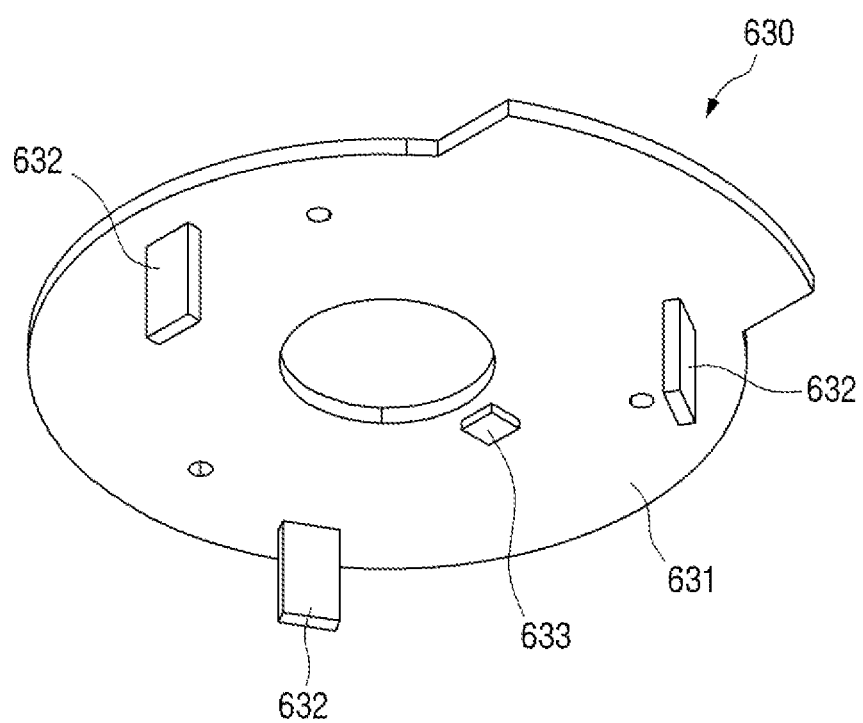
FIG. 22 schematically illustrates a substrate in the automotive transmission control apparatus according to the exemplary embodiment of the present disclosure.
Figure 23:
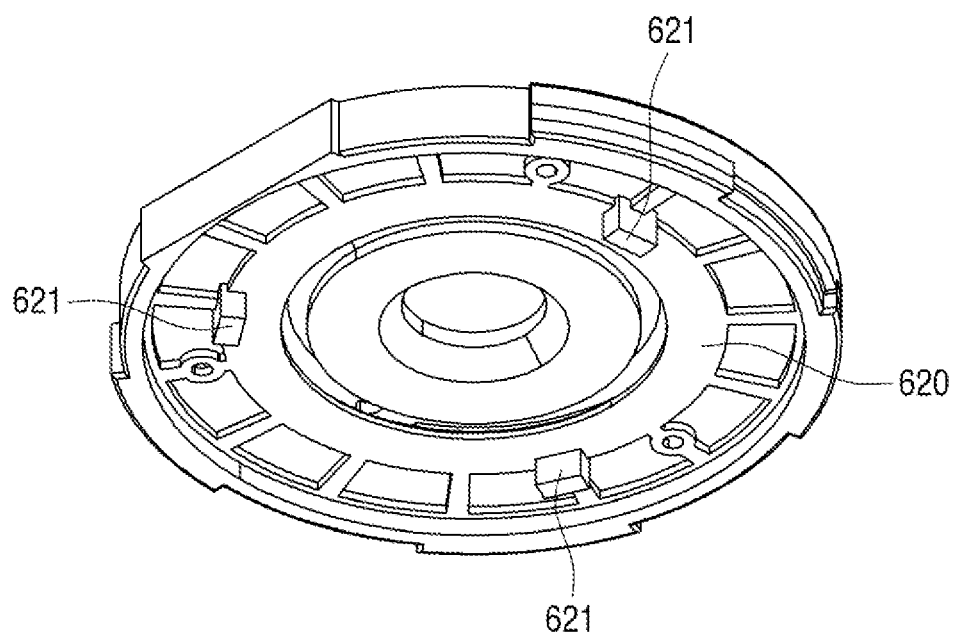
FIG. 23 schematically illustrates a lower surface of the support member in the automotive transmission control apparatus according to the exemplary embodiment of the present disclosure.

FIG. 19 is a schematic exploded perspective view of the automotive transmission control apparatus 1 including the sensing member 600 according to the exemplary embodiment. FIG. 20 is a schematic exploded perspective view of the sensing member 600 in the automotive transmission control apparatus 1 according to the exemplary embodiment. FIG. 21 schematically illustrates the support member 620 in the automotive transmission control apparatus 1 according to the exemplary embodiment, shown with Hall sensors 632 and 633. FIG. 22 schematically illustrates a substrate 630 in the automotive transmission control apparatus 1 according to the exemplary embodiment. FIG. 23 schematically illustrates a lower surface of the support member 620 in the automotive transmission control apparatus 1 according to the exemplary embodiment.

Referring to FIGS. 19-23, the automotive transmission control apparatus 1 according to the exemplary embodiment may further include the sensing member 600. The sensing member 600 may be provided between the output unit 500 and the housing 100, and may determine a gear position by detecting the rotation of the output unit 500 as well as by detecting the rotation of the driving unit 400. The sensing member 600 may include a member for detecting the rotation of the driving unit 400 and a member for sensing the rotation of the output unit 500. More specifically, the sensing member 600 may include the substrate 630, a permanent magnet 610, a first Hall sensor 632, second Hall sensors 633, and the support member 620. The sensing member 600 may be disposed between the output unit 500 and the housing 100.

First, the substrate 630 may be provided between the output unit 500 and the housing 100, more specifically, between the output unit 500 and the cover member 120. The first Hall sensor 632 and the second Hall sensors 633 may be mounted on a surface of the substrate 630. The first Hall sensor 632 may detect a magnetic force by interacting with the permanent magnet 610 to be described later. In addition, the second Hall sensors 633 may detect a magnetic force by interacting with the rotor 420 of the driving unit 400, i.e., magnets 423 mounted on the outer circumferential surface of the rotor 420. The permanent magnet 610 that is rotated due to the rotation of the output body 520 may be mounted on a surface of the output body 520. At least one first Hall sensor 632 may be provided on the substrate 630 to correspond to the position of the permanent magnet 610, and one or more, for example, three second Hall sensors 633 may be provided to correspond to the positions of the magnets 423 of the rotor 420.

The support member 620 may be provided between the substrate 630 and the output unit 500 to fix the substrate 630 to the cover member 120 and may support the substrate 630. A first accommodating groove 621 and second accommodating grooves 622 may be provided in the support member 620. The first accommodating groove 621 and the second accommodating grooves 622 may be recessed downward from a surface of the support member 620 and may accommodate the first Hall sensor 632 and the second hall sensors 633, respectively.

The first accommodating groove 621 and the second accommodating grooves 622 may have closed bottom surfaces. The first Hall sensor 632 and the second Hall sensors 633 may extend from the surface of the substrate 630 toward the bottom surface of the housing 100. In particular, the first Hall sensor 632 and the second Hall sensors 633 may be separated from the substrate 630. However, the first accommodating groove 621 and the second accommodating grooves 622 may prevent the first Hall sensor 632 and the second Hall sensors 633 from being separated from the substrate 630 and support the first Hall sensor 632 and the second Hall sensors 633 and maintain the first Hall sensor 632 and the second Hall sensors 633 to be coupled to the substrate 630.

Figure 24:
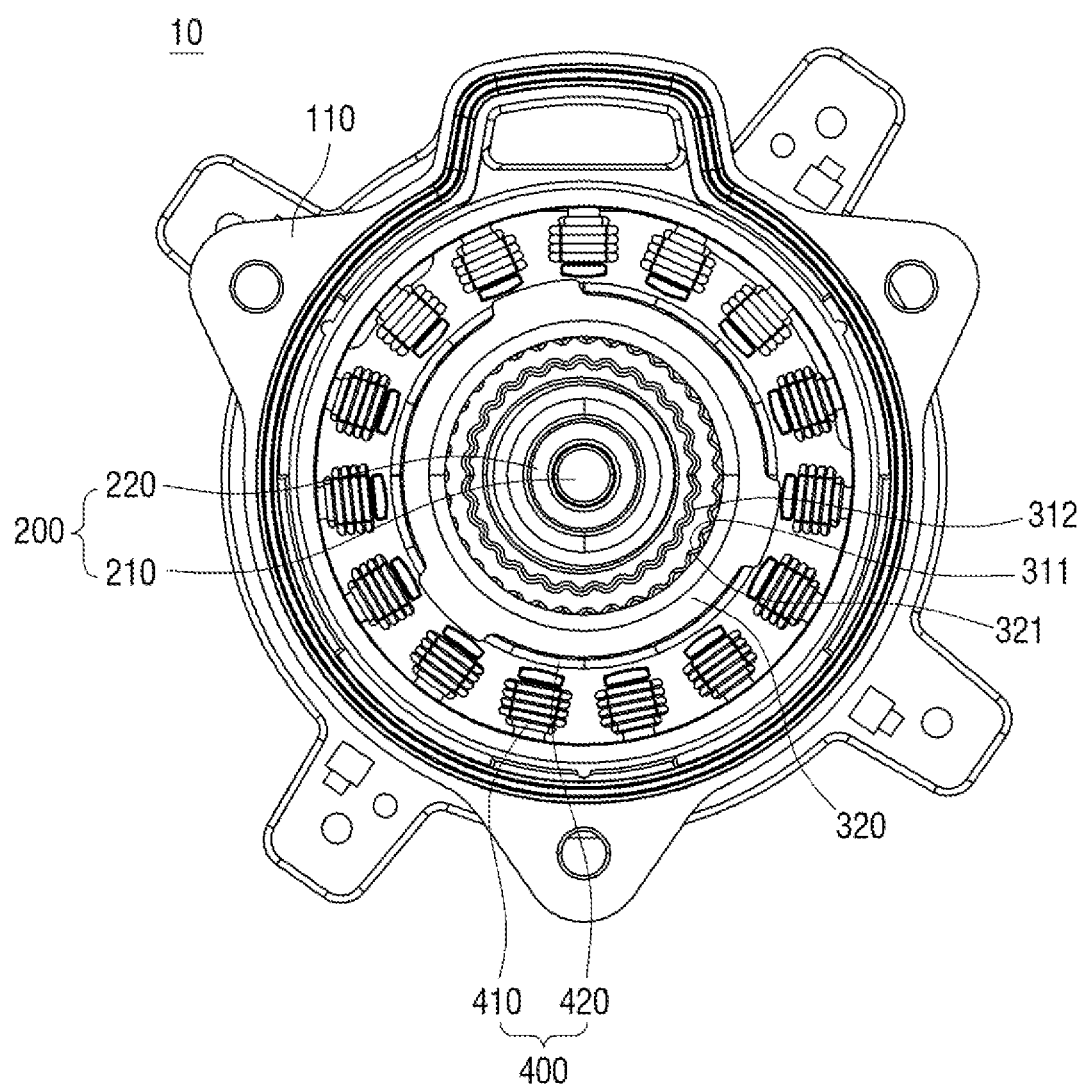
FIG. 24 is a coupled plan view illustrating the automotive transmission control apparatus according to the exemplary embodiment of the present disclosure, shown without the output unit.
Figure 25:
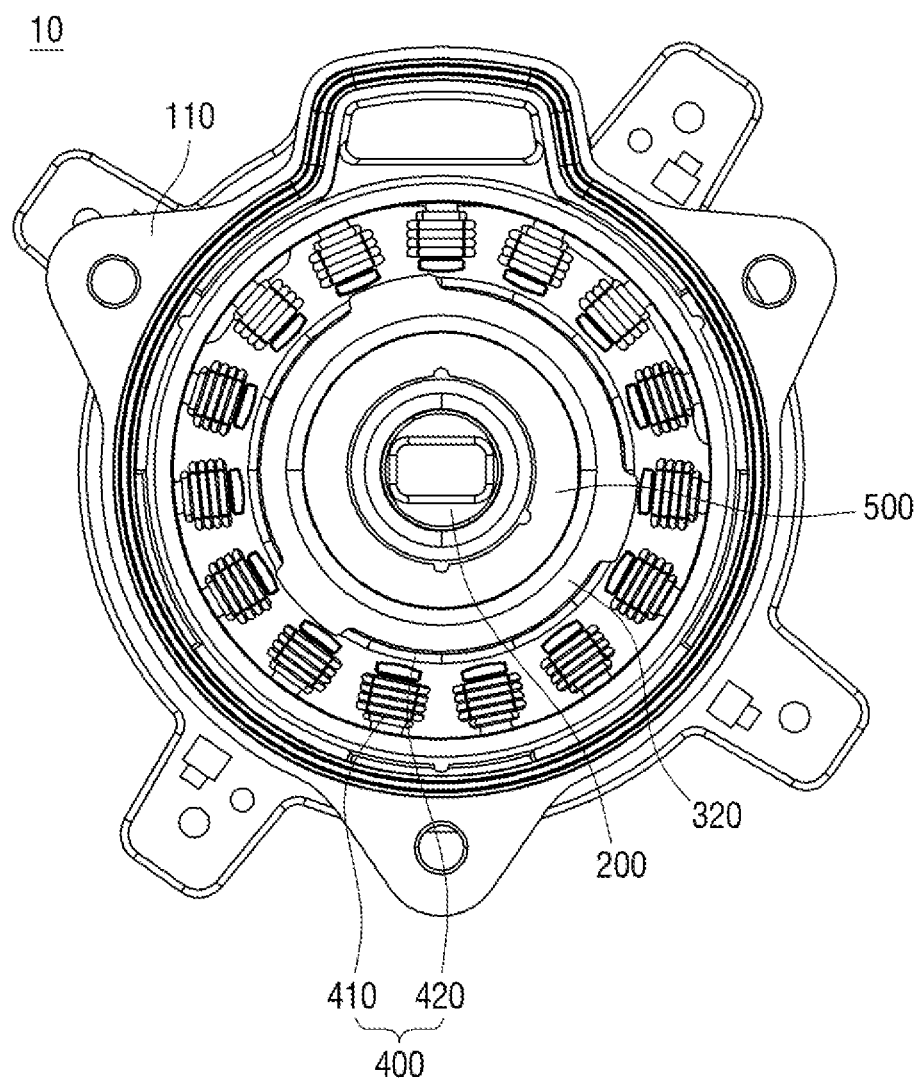
FIG. 25 is a coupled plan view of the automotive transmission control apparatus according to the exemplary embodiment of the present disclosure, shown with the output unit.

FIG. 24 is a coupled plan view illustrating the automotive transmission control apparatus 1 according to the exemplary embodiment, shown without the output unit 500. FIG. 25 is a coupled plan view of the automotive transmission control apparatus 1 according to the exemplary embodiment, shown with the output unit 500.

Referring to FIGS. 24 and 25, in the automotive transmission control apparatus 1 according to the exemplary embodiment, the main shaft 200 may protrude in the housing 100, for example, in the central part of the housing space S1 of the main body 110. The substrate 811 of the position sensing unit 800 may be disposed on the bottom surface of the housing 100 with the main shaft 200 as an axis. The stator 410 having the rotor 420 may be disposed on the substrate 811 in the housing space S1. The stator 410 may be non-rotatably fixed to the housing 100. In addition, the rotor 420 may be rotated about the first axis ax1 of the main shaft 200. The reduction unit 300 may be disposed within the inner housing space S3 of the rotor 420 and may be fitted to the main shaft 200, more specifically to the eccentric rotary body 220 of the main shaft 200 and the upper end 211 of the main rotary body 210, such that it may be rotated about the first axis ax1 and the second axis ax2. In other words, the inner gear member 310 may be disposed on the eccentric rotary body 220 of the main shaft 200, and the first receiving gear portion 321 of the outer gear member 320 may be engaged with the first gear portion 311 of the inner gear member 310. The reduction unit 300 may be coupled to the main rotary body 210 at the upper end of the main shaft 200.

The output unit 500 may be disposed on an upper surface of the inner gear member 310. The output unit 500 may be disposed on an upper surface of the first tier of the inner gear member 310 to engage with the outer circumference of the second tier of the inner gear member while being fitted to the main shaft 200. In particular, the second receiving gear portion 511 formed on the inner circumferential surface of the space of the output body 520 of the output unit 500 may engage with the second gear portion 312 formed on the outer circumference of the second tier of the inner gear member 310. The sensing member 600 may be disposed between the output unit 500 and the support member 620. After the driving unit 400 is disposed within the housing space S1 of the main body 110, the reduction unit 300, the output unit 500, and the main shaft 200 may be disposed within the housing space S3 of the driving unit 400.

In a state where the position sensing unit 800, the driving unit 400, the reduction unit 300, the output unit 500, and the sensing member 600 substantially coaxial to the main shaft 200 as described above are provided in a radially inner direction of the rotor 420, the cover member 120 may be coupled to the main body 110. The output unit 500 may protrude from a center of the cover member 120 and may thus be exposed.

In the driving of the automotive transmission control apparatus 1 coupled as described above, as the coils 412 that form three phases are repeatedly excited by a power applied to the coils 412, the rotor 420 may rotate about the first axis ax1 of the main shaft 200. The reduction unit 300, for example, the inner gear member 310 may rotate about the central axis ax2 of the eccentric rotary body 220. The reduction ratio of the output unit 500 may be determined based on a gear ratio of the first receiving gear portion 321 of the outer gear member 320 and the second receiving gear portion 511 of the output unit 500 which are engaged with the first gear portion 311 of the first tier of the inner gear member 310 and the second gear portion 312 of the second tier of the inner gear member 310, respectively.

Since the driving unit 400 is disposed within the housing space S1 of the housing 100, and the reduction unit 300 and the output unit 500 are substantially coaxially coupled to each other in the housing space S3 of the driving unit 400, the size of the automotive transmission control apparatus 1 may be reduced. In addition, since the inner gear member 310 has two tiers, and the first gear portion 311 of the first tier and the second gear portion 312 of the second tier are engaged with the first receiving gear portion 321 of the outer gear member 320 and the second receiving gear portion 511 of the output unit 500, respectively, the rotation speed of the driving unit 400 may be reduced. Therefore, the output torque of the output unit 500 may be increased as compared with a conventional structure in which the above elements are diagonally or biaxially coupled to each other. Since the reduction unit 300 is mounted in the housing space S3 of the driving unit 400, a weight of the automotive transmission control apparatus 1 may be decreased.

As described above, in an automotive transmission control apparatus according to an exemplary embodiment of the present disclosure, a reduction unit may be disposed within an inner space of a driving unit to allow the reduction unit and the driving unit to be disposed coaxially to each other. Therefore, the size of the automotive transmission control apparatus may be reduced.

In addition, in the automotive transmission control apparatus according to the exemplary embodiment, an inner gear member may be eccentrically coupled to a main shaft and formed in two tiers having a first gear portion and a second gear portion formed on the outside. A first receiving gear portion of an outer gear member may be engaged and rotated with the first gear portion, and a second receiving gear portion of an output body may be engaged and rotated with the second gear portion. This configuration may increase the precision of coupling between the driving unit and the reduction unit, the coupling between the outer gear member and the inner gear member, and the coupling between the reduction unit and an output unit. The increased precision may improve the efficiency of transmitting a rotational force, thereby improving the output torque of an output axis of the reduction unit. Consequently, high power may be achieved.

In addition, due to the eccentric shape of the main shaft, the inner gear member may eccentrically rotate (e.g., rotate about its own axis while revolving around a primary axis of the main shaft) when the main shaft rotates. Therefore, the coupling structure of the reduction unit may be simplified.

However, the effects of the exemplary embodiments are not restricted to the ones set forth herein. The above and other effects of the exemplary embodiments will become more apparent to one of ordinary skill in the art to which the present disclosure pertains by referencing the claims.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. An automotive transmission control apparatus comprising:

a housing;

a main shaft disposed in the housing;

a driving unit coupled to the main shaft and configured to be driven based on a signal for controlling a gear position of a transmission;

a reduction unit housed within the driving unit; and an output unit that receives a rotational force of the reduction unit and outputs the rotational force with a reduced rotational speed, wherein the reduction unit comprises:

an inner gear member coupled to the main shaft and including a first gear portion and a second gear portion; and an outer gear member fixed to the housing and including a first receiving gear portion engaged with the first gear portion, wherein the output unit comprises an output body that forms a second receiving gear portion engaged with the second gear portion, and wherein the inner gear member, the outer gear member, and the output body are received within the driving unit.

2. The apparatus of claim 1, wherein the output unit further comprises:

an output shaft that protrudes from the output body, into which the main shaft is inserted, wherein the output shaft transmits the rotational force of the reduction unit.

3. The apparatus of claim 2, wherein the main shaft rotates due to the driving of the driving unit and comprises a main rotary body that rotates about a first axis due to a rotation of the driving unit.

4. The apparatus of claim 3, wherein the main shaft comprises an eccentric rotary body which is provided along an outer circumferential surface of the main rotary body and rotates about a second axis that is eccentric from the first axis due to the rotation of the driving unit, and wherein the inner gear member is coupled to the eccentric rotary body.

5. The apparatus of claim 4, wherein the main rotary body rotates about the first axis that extends from a center of the driving unit, and the eccentric rotary body rotates about the second axis that is spaced apart from the first axis by a predetermined distance and parallel to the first axis.

6. The apparatus of claim 1, wherein a bearing member is further provided on an outside of the main shaft.

7. The apparatus of claim 6, wherein a fixing protrusion for fixing the bearing member protrudes along an outer circumferential surface of the main shaft.

8. The apparatus of claim 7, wherein the bearing member comprises:

a first bearing disposed between the main rotary body at a lower end of the main shaft and the housing;

at least one second bearing disposed between the eccentric rotary body of the main shaft and an inner surface of the inner gear member, wherein the at least one second bearing is disposed on the fixing protrusion; and a third bearing disposed between the main rotary body at an upper end of the main shaft and an inner surface of the output unit.

9. The apparatus of claim 8, wherein the second bearing comprises:

an upper bearing disposed under the third bearing; and a lower bearing disposed on the fixing protrusion and under the upper bearing.

10. The apparatus of claim 1, wherein the housing comprises:

a main body that forms a housing space to receive the driving unit, the reduction unit, and the output unit; and a cover member coupled onto the main body to cover the housing space.

11. The apparatus of claim 10, wherein a seating portion, on which the lower end of the main shaft and the first bearing are disposed, is formed in an inner bottom surface of the main body.

12. The apparatus of claim 10, wherein a driving control unit is further mounted on a surface of the main body to apply power to the driving unit and control a rotation of the driving unit.

13. The apparatus of claim 10, wherein an opening, in which the output shaft is accommodated and exposed, is formed in the cover member.

14. The apparatus of claim 1, wherein a difference between a number of teeth of the first gear portion and a number of teeth of the first receiving gear portion is equal to or less than four, and a difference between a number of teeth of the second gear portion and a number of teeth of the second receiving gear portion is equal to or less than four.

15. The apparatus of claim 1, wherein the driving unit comprises:

a stator that comprises a stator core fixed to the housing and a plurality of coils disposed along an inner circumference of the stator core; and a rotor disposed within the stator and rotatably and coaxially coupled to the main shaft, wherein the rotor includes magnets that correspond to the plurality of coils.

16. The apparatus of claim 15, wherein a sensing member is further provided between the output unit and the housing to determine the gear position by detecting a rotation of the driving unit and detecting a rotation of the output unit.

17. The apparatus of claim 16, wherein the sensing member comprises:

a substrate disposed between the output unit and the housing;

a permanent magnet provided on a surface of the output unit and rotated due to the rotation of the output unit;

a first Hall sensor provided on the substrate to detect a position of the permanent magnet; and a second Hall sensor provided on the substrate to detect a rotation of the rotor by interacting with the rotor provided in the driving unit.

18. The apparatus of claim 17, wherein a support member for supporting the substrate is further provided between the substrate and the output unit and comprises a first accommodating groove for accommodating the first Hall sensor and a second accommodating groove for accommodating the second Hall sensor.

19. The apparatus of claim 2, wherein the first gear portion and the second gear portion have a cycloidal tooth profile, and the first receiving gear portion and the second receiving gear portion have a tooth profile that corresponds to the cycloidal tooth profile of the first gear portion and the second gear portion.

* * * * *